US008326702B2

(12) United States Patent
Herrmann et al.

(10) Patent No.: US 8,326,702 B2
(45) Date of Patent: Dec. 4, 2012

(54) PROVIDING SUPPLIER RELATIONSHIP MANAGEMENT SOFTWARE APPLICATION AS ENTERPRISE SERVICES

(75) Inventors: Karina Herrmann, Weinheim (DE); Andreas Brossler, Leingarten (DE); Peter J. Neumayer, Edenkoben (DE); Torsten Reichardt, Malsoh (DE); Markus Biehler, Landau (DE); Hueseyin Haybat, Mannheim (DE); Christoph Jungkind, Heidelberg (DE); Pascal Hochwarth, Muehlhausen (DE); Shyam Mukundan, Bangalore (IN); Amrish Singh, Wiesloch (DE); Karin Brecht-Tillinger, Edingen-Neckarhausen (DE); Zeno Rummler, Stutensee (DE); Peter Fitz, Waldsee (DE); Ralf Sievers, Walldorf (DE); Antonia Gross, Nussloch (DE); Brit Panzer, Mannheim (DE); Tobias Hoppe-Boeken, Weisbaden (DE); Paola Sala, Heidelberg (DE); Andre Wagner, Sinsheim (DE); Giovanni Deledda, Rauenberg (DE); Robert Reiner, Waghaeusel-Kirrlach (DE); Benjamin Klehr, Rastatt (DE)

(73) Assignee: SAP AG, Walldorf (DE)

( * ) Notice: Subject to any disclaimer, the term of this patent is extended or adjusted under 35 U.S.C. 154(b) by 1088 days.

(21) Appl. No.: 11/396,258

(22) Filed: Mar. 30, 2006

(65) Prior Publication Data
US 2007/0265860 A1 Nov. 15, 2007

(51) Int. Cl.
G06Q 30/00 (2006.01)
G06Q 90/00 (2006.01)

(52) U.S. Cl. .......... 705/26.8; 705/7.11; 705/26.81; 705/26.35

(58) Field of Classification Search .......... 705/7, 26, 705/27, 5.11, 7.11, 26.35, 26.8, 26.81
See application file for complete search history.

(56) References Cited

U.S. PATENT DOCUMENTS

| | | | |
|---|---|---|---|
| 4,947,321 A | | 8/1990 | Spence et al. |
| 5,361,198 A | | 11/1994 | Harmon et al. |
| 5,550,734 A | | 8/1996 | Tarter et al. |
| 5,556,097 A | * | 9/1996 | Endo et al. ............. 473/309 |
| 5,560,005 A | | 9/1996 | Hoover et al. |
| 5,566,097 A | * | 10/1996 | Myers et al. ............. 703/15 |
| 5,586,312 A | | 12/1996 | Johnson et al. |
| 5,590,277 A | | 12/1996 | Fuchs et al. |
| 5,632,022 A | * | 5/1997 | Warren et al. ............ 715/776 |
| 5,634,127 A | | 5/1997 | Cloud et al. |
| 5,680,619 A | | 10/1997 | Gudmundson et al. |

(Continued)

FOREIGN PATENT DOCUMENTS
WO 00/23874 4/2000

(Continued)

OTHER PUBLICATIONS

Anon., "Sequent Corp Bell Atlantic: Bell Atlantic Selects Sequent for Video-on-Demand Program; Sequent Moves to Seize Opportunity in New Market," Business Wire, Dec. 6, 1994.*

(Continued)

Primary Examiner — Nicholas D Rosen
(74) Attorney, Agent, or Firm — Fish & Richardson P.C.

(57) ABSTRACT

Methods and apparatus, including systems and computer program products, for a services architecture design that provides enterprise services having supplier relationship management functionality at the level of an enterprise application. The design includes a set of service operations, process components, and optionally deployment units. Suitable business objects are also described.

22 Claims, 19 Drawing Sheets

U.S. PATENT DOCUMENTS

| | | | |
|---|---|---|---|
| 5,704,044 A | 12/1997 | Tarter et al. | |
| 5,710,917 A | 1/1998 | Musa et al. | |
| 5,768,119 A | 6/1998 | Havekost et al. | |
| 5,822,585 A | 10/1998 | Noble et al. | |
| 5,832,218 A | 11/1998 | Gibbs et al. | |
| 5,848,291 A | 12/1998 | Milne et al. | |
| 5,867,495 A | 2/1999 | Elliott et al. | |
| 5,870,588 A | 2/1999 | Rompaey et al. | |
| 5,881,230 A | 3/1999 | Christensen et al. | |
| 5,893,106 A | 4/1999 | Brobst et al. | |
| 5,898,872 A | 4/1999 | Richley | |
| 5,918,219 A | 6/1999 | Isherwood | |
| 5,987,247 A | 11/1999 | Lau | |
| 5,991,536 A | 11/1999 | Brodsky et al. | |
| H1830 H | 1/2000 | Petrimoulx et al. | |
| 6,028,997 A | 2/2000 | Leymann et al. | |
| 6,038,393 A | 3/2000 | Iyengar et al. | |
| 6,049,838 A | 4/2000 | Miller et al. | |
| 6,067,559 A | 5/2000 | Allard et al. | |
| 6,070,197 A | 5/2000 | Cobb et al. | |
| 6,112,024 A | 8/2000 | Almond et al. | |
| 6,151,582 A | 11/2000 | Huang et al. | |
| 6,167,563 A | 12/2000 | Fontana et al. | |
| 6,167,564 A | 12/2000 | Fontana et al. | |
| 6,177,932 B1 | 1/2001 | Galdes et al. | |
| 6,182,133 B1 | 1/2001 | Horvitz | |
| 6,192,390 B1 | 2/2001 | Berger et al. | |
| 6,208,345 B1 | 3/2001 | Sheard et al. | |
| 6,237,136 B1 * | 5/2001 | Sadahiro | 717/110 |
| 6,272,672 B1 | 8/2001 | Conway | |
| 6,311,170 B1 | 10/2001 | Embrey | |
| 6,338,097 B1 | 1/2002 | Krenzke et al. | |
| 6,424,991 B1 | 7/2002 | Gish | |
| 6,434,740 B1 | 8/2002 | Monday et al. | |
| 6,442,748 B1 | 8/2002 | Bowman-Amuah | |
| 6,445,782 B1 | 9/2002 | Elfe et al. | |
| 6,446,045 B1 | 9/2002 | Stone et al. | |
| 6,446,092 B1 | 9/2002 | Sutter | |
| 6,473,794 B1 | 10/2002 | Guheen et al. | |
| 6,493,716 B1 | 12/2002 | Azagury et al. | |
| 6,571,220 B1 | 5/2003 | Ogino et al. | |
| 6,594,535 B1 | 7/2003 | Constanza | |
| 6,601,233 B1 | 7/2003 | Underwood | |
| 6,601,234 B1 | 7/2003 | Bowman-Amuah | |
| 6,606,744 B1 | 8/2003 | Mikurak | |
| 6,609,100 B2 | 8/2003 | Smith et al. | |
| 6,640,238 B1 | 10/2003 | Bowman-Amuah | |
| 6,671,673 B1 | 12/2003 | Baseman et al. | |
| 6,678,882 B1 | 1/2004 | Hurley et al. | |
| 6,687,734 B1 | 2/2004 | Sellink et al. | |
| 6,691,151 B1 | 2/2004 | Cheyer et al. | |
| 6,721,783 B1 | 4/2004 | Blossman et al. | |
| 6,738,964 B1 | 5/2004 | Zink et al. | |
| 6,747,679 B1 | 6/2004 | Finch et al. | |
| 6,750,885 B1 | 6/2004 | Finch et al. | |
| 6,757,837 B1 | 6/2004 | Platt et al. | |
| 6,764,009 B2 | 7/2004 | Melick et al. | |
| 6,772,216 B1 | 8/2004 | Ankireddipally et al. | |
| 6,782,536 B2 | 8/2004 | Moore et al. | |
| 6,789,252 B1 | 9/2004 | Burke et al. | |
| 6,845,499 B2 | 1/2005 | Srivastava et al. | |
| 6,847,854 B2 | 1/2005 | Discenzo | |
| 6,859,931 B1 | 2/2005 | Cheyer et al. | |
| 6,889,197 B2 | 5/2005 | Lidow | |
| 6,889,375 B1 | 5/2005 | Chan et al. | |
| 6,895,438 B1 | 5/2005 | Ulrich | |
| 6,898,783 B1 | 5/2005 | Gupta et al. | |
| 6,904,399 B2 | 6/2005 | Cooper et al. | |
| 6,907,395 B1 | 6/2005 | Hunt et al. | |
| 6,954,736 B2 | 10/2005 | Menninger et al. | |
| 6,985,939 B2 | 1/2006 | Fletcher et al. | |
| 6,990,466 B1 | 1/2006 | Hu | |
| 7,003,474 B2 | 2/2006 | Lidow | |
| 7,031,998 B2 | 4/2006 | Archbold | |
| 7,043,448 B2 | 5/2006 | Campbell | |
| 7,047,518 B2 | 5/2006 | Little et al. | |
| 7,050,056 B2 | 5/2006 | Meyringer | |
| 7,050,873 B1 | 5/2006 | Discenzo | |
| 7,055,136 B2 | 5/2006 | Dzoba et al. | |
| 7,058,587 B1 | 6/2006 | Horne | |
| 7,069,536 B2 | 6/2006 | Yaung | |
| 7,072,855 B1 * | 7/2006 | Godlewski et al. | 705/22 |
| 7,076,766 B2 | 7/2006 | Wirts et al. | |
| 7,100,195 B1 | 8/2006 | Underwood | |
| 7,103,873 B2 | 9/2006 | Tanner et al. | |
| 7,117,447 B2 | 10/2006 | Cobb et al. | |
| 7,120,597 B1 | 10/2006 | Knudtzon et al. | |
| 7,120,896 B2 | 10/2006 | Budhiraja et al. | |
| 7,131,069 B1 | 10/2006 | Rush et al. | |
| 7,149,887 B2 | 12/2006 | Morrison et al. | |
| 7,155,403 B2 | 12/2006 | Cirulli et al. | |
| 7,155,409 B1 | 12/2006 | Stroh | |
| 7,181,694 B2 | 2/2007 | Reiss et al. | |
| 7,184,964 B2 | 2/2007 | Wang | |
| 7,194,431 B1 | 3/2007 | Land et al. | |
| 7,197,740 B2 | 3/2007 | Beringer et al. | |
| 7,200,569 B2 | 4/2007 | Gallagher et al. | |
| 7,206,768 B1 | 4/2007 | deGroeve et al. | |
| 7,213,232 B1 | 5/2007 | Knowles | |
| 7,216,091 B1 | 5/2007 | Blandina et al. | |
| 7,219,107 B2 | 5/2007 | Beringer | |
| 7,222,786 B2 | 5/2007 | Renz et al. | |
| 7,225,240 B1 | 5/2007 | Fox et al. | |
| 7,249,044 B2 | 7/2007 | Kumar et al. | |
| 7,257,254 B2 | 8/2007 | Tunney | |
| 7,283,973 B1 | 10/2007 | Loghmani et al. | |
| 7,293,254 B2 | 11/2007 | Bloesch et al. | |
| 7,299,970 B1 | 11/2007 | Ching | |
| 7,315,830 B1 | 1/2008 | Wirtz et al. | |
| 7,322,024 B2 | 1/2008 | Carlson et al. | |
| 7,324,966 B2 | 1/2008 | Scheer | |
| 7,353,180 B1 | 4/2008 | Silverstone et al. | |
| 7,356,492 B2 | 4/2008 | Hazi et al. | |
| 7,367,011 B2 | 4/2008 | Ramsey et al. | |
| 7,370,315 B1 | 5/2008 | Lovell et al. | |
| 7,376,601 B1 | 5/2008 | Aldridge | |
| 7,376,604 B1 | 5/2008 | Butcher | |
| 7,376,632 B1 | 5/2008 | Sadek et al. | |
| 7,383,201 B2 | 6/2008 | Matsuzaki et al. | |
| 7,386,833 B2 | 6/2008 | Granny et al. | |
| 7,406,716 B2 | 7/2008 | Kanamori et al. | |
| 7,415,697 B1 | 8/2008 | Houlding | |
| 7,418,409 B1 | 8/2008 | Goel | |
| 7,418,424 B2 | 8/2008 | Martin et al. | |
| 7,424,701 B2 | 9/2008 | Kendall et al. | |
| 7,433,979 B2 | 10/2008 | Need | |
| 7,448,022 B1 | 11/2008 | Ram et al. | |
| 7,451,432 B2 | 11/2008 | Shukla et al. | |
| 7,460,654 B1 | 12/2008 | Jenkins et al. | |
| 7,461,030 B2 | 12/2008 | Hibler et al. | |
| 7,469,233 B2 | 12/2008 | Shooks et al. | |
| 7,516,088 B2 | 4/2009 | Johnson et al. | |
| 7,523,054 B2 | 4/2009 | Tyson-Quah | |
| 7,529,699 B2 | 5/2009 | Fuse et al. | |
| 7,536,325 B2 | 5/2009 | Randell et al. | |
| 7,536,354 B1 | 5/2009 | deGroeve et al. | |
| 7,546,520 B2 | 6/2009 | Davidson et al. | |
| 7,546,575 B1 | 6/2009 | Dillman et al. | |
| 7,565,640 B2 | 7/2009 | Shukla et al. | |
| 7,574,694 B2 | 8/2009 | Mangan et al. | |
| 7,624,371 B2 | 11/2009 | Kulkarni et al. | |
| 7,631,291 B2 | 12/2009 | Shukla et al. | |
| 7,640,195 B2 | 12/2009 | Von Zimmermann et al. | |
| 7,640,291 B2 | 12/2009 | Maturana et al. | |
| 7,644,390 B2 | 1/2010 | Khodabandehloo et al. | |
| 7,657,406 B2 | 2/2010 | Tolone et al. | |
| 7,657,445 B1 | 2/2010 | Goux | |
| 7,665,083 B2 | 2/2010 | Demant et al. | |
| 7,668,761 B2 | 2/2010 | Jenkins et al. | |
| 7,672,888 B2 | 3/2010 | Allin et al. | |
| 7,681,176 B2 * | 3/2010 | Wills et al. | 717/109 |
| 7,693,586 B2 | 4/2010 | Dumas et al. | |
| 7,703,073 B2 | 4/2010 | Illowsky et al. | |
| 7,739,160 B1 * | 6/2010 | Ryan et al. | 705/31 |
| 7,742,985 B1 | 6/2010 | Digrigoli et al. | |
| 7,747,980 B2 | 6/2010 | Illowsky et al. | |
| 7,765,156 B2 | 7/2010 | Staniar et al. | |

| | | | | | |
|---|---|---|---|---|---|
| 7,765,521 B2 | 7/2010 | Bryant | 2005/0113092 A1 | 5/2005 | Coppinger et al. |
| 7,788,145 B2 | 8/2010 | Wadawadigi et al. | 2005/0114829 A1 | 5/2005 | Robin et al. |
| 7,788,319 B2 | 8/2010 | Schmidt | 2005/0125310 A1 | 6/2005 | Hazi et al. |
| 7,793,256 B2 | 9/2010 | Charisius et al. | 2005/0144125 A1 | 6/2005 | Erbey et al. |
| 7,793,258 B2 | 9/2010 | Sundararajan et al. | 2005/0144226 A1 | 6/2005 | Purewal |
| 7,797,698 B2 | 9/2010 | Diament et al. | 2005/0156500 A1 | 7/2005 | Birecki et al. |
| 7,814,142 B2 | 10/2010 | Mamou et al. | 2005/0160104 A1 | 7/2005 | Meera et al. |
| 7,822,682 B2 | 10/2010 | Arnold et al. | 2005/0165784 A1 | 7/2005 | Gomez et al. |
| 7,835,971 B2 | 11/2010 | Stockton et al. | 2005/0177435 A1 | 8/2005 | Lidow |
| 7,886,041 B2 | 2/2011 | Outhred et al. | 2005/0203760 A1 | 9/2005 | Gottumukkala et al. |
| 7,895,568 B1 | 2/2011 | Goodwin et al. | 2005/0203813 A1 | 9/2005 | Welter et al. |
| 7,904,350 B2 | 3/2011 | Ayala et al. | 2005/0209732 A1 | 9/2005 | Audimoolam et al. |
| 7,912,755 B2 | 3/2011 | Perry et al. | 2005/0209943 A1 | 9/2005 | Ballow et al. |
| 7,917,889 B2 | 3/2011 | Devarakonda et al. | 2005/0216325 A1 | 9/2005 | Ziad et al. |
| 7,925,985 B2 | 4/2011 | Moore | 2005/0216507 A1 | 9/2005 | Wright |
| 8,001,519 B2 | 8/2011 | Conallen et al. | 2005/0222896 A1 | 10/2005 | Rhyne et al. |
| 8,010,938 B2 | 8/2011 | Elaasar | 2005/0234787 A1 | 10/2005 | Wallmeier et al. |
| 8,051,332 B2 | 11/2011 | Zakonov et al. | 2005/0235020 A1 | 10/2005 | Gabelmann et al. |
| 8,091,065 B2 | 1/2012 | Mir et al. | 2005/0240592 A1 | 10/2005 | Mamou et al. |
| 8,112,738 B2 | 2/2012 | Pohl et al. | 2005/0246250 A1 | 11/2005 | Murray |
| 2001/0052108 A1 | 12/2001 | Bowman-Amuah | 2005/0246482 A1 | 11/2005 | Gabelmann et al. |
| 2002/0026394 A1 | 2/2002 | Savage et al. | 2005/0256775 A1 | 11/2005 | Schapler et al. |
| 2002/0042756 A1 | 4/2002 | Kumar et al. | 2005/0256882 A1 | 11/2005 | Able et al. |
| 2002/0049622 A1 | 4/2002 | Lettich et al. | 2005/0257125 A1 | 11/2005 | Roesner et al. |
| 2002/0073114 A1 | 6/2002 | Nicastro et al. | 2005/0257197 A1 | 11/2005 | Herter et al. |
| 2002/0078046 A1 | 6/2002 | Uluakar et al. | 2005/0262192 A1 | 11/2005 | Mamou et al. |
| 2002/0082892 A1 | 6/2002 | Raffel et al. | 2005/0262453 A1 | 11/2005 | Massasso |
| 2002/0103660 A1 | 8/2002 | Cramon et al. | 2005/0284934 A1 | 12/2005 | Ernesti et al. |
| 2002/0104071 A1 | 8/2002 | Charisius et al. | 2005/0288987 A1 | 12/2005 | Sattler et al. |
| 2002/0107826 A1 | 8/2002 | Ramachandran et al. | 2005/0289020 A1 | 12/2005 | Bruns et al. |
| 2002/0120553 A1 | 8/2002 | Bowman-Amuah | 2005/0289079 A1 | 12/2005 | Krishan et al. |
| 2002/0133368 A1 | 9/2002 | Strutt et al. | 2006/0004802 A1 | 1/2006 | Phillips et al. |
| 2002/0138281 A1* | 9/2002 | Cirulli et al. ............... 705/1 | 2006/0053063 A1 | 3/2006 | Nagar |
| 2002/0138358 A1 | 9/2002 | Scheer | 2006/0064344 A1 | 3/2006 | Lidow |
| 2002/0143598 A1 | 10/2002 | Scheer | 2006/0074704 A1 | 4/2006 | Shukla et al. |
| 2002/0156695 A1 | 10/2002 | Edwards | 2006/0074731 A1 | 4/2006 | Green et al. |
| 2002/0161907 A1 | 10/2002 | Moon | 2006/0080338 A1 | 4/2006 | Seubert et al. |
| 2002/0184111 A1 | 12/2002 | Swanson | 2006/0085243 A1 | 4/2006 | Cooper et al. |
| 2002/0188486 A1 | 12/2002 | Gil et al. | 2006/0085294 A1 | 4/2006 | Boerner et al. |
| 2002/0198798 A1 | 12/2002 | Ludwig et al. | 2006/0085336 A1 | 4/2006 | Seubert et al. |
| 2002/0198828 A1 | 12/2002 | Ludwig et al. | 2006/0089886 A1 | 4/2006 | Wong |
| 2003/0009754 A1 | 1/2003 | Rowley et al. | 2006/0095439 A1 | 5/2006 | Buchmann et al. |
| 2003/0058277 A1 | 3/2003 | Bowman-Amuah | 2006/0129978 A1 | 6/2006 | Abrari et al. |
| 2003/0069774 A1 | 4/2003 | Hoffman et al. | 2006/0143029 A1 | 6/2006 | Akbay et al. |
| 2003/0074271 A1 | 4/2003 | Viswanath et al. | 2006/0149574 A1 | 7/2006 | Bradley et al. |
| 2003/0074360 A1 | 4/2003 | Chen et al. | 2006/0206352 A1 | 9/2006 | Pulianda |
| 2003/0083762 A1 | 5/2003 | Farrah et al. | 2006/0248504 A1 | 11/2006 | Hughes |
| 2003/0084127 A1 | 5/2003 | Budhiraja et al. | 2006/0274720 A1 | 12/2006 | Adams et al. |
| 2003/0130860 A1 | 7/2003 | Datta et al. | 2006/0287939 A1 | 12/2006 | Harel et al. |
| 2003/0182206 A1 | 9/2003 | Hendrix et al. | 2006/0288350 A1 | 12/2006 | Grigorovitch et al. |
| 2003/0212602 A1 | 11/2003 | Schaller | 2007/0011650 A1 | 1/2007 | Hage et al. |
| 2003/0233290 A1 | 12/2003 | Yang et al. | 2007/0022410 A1 | 1/2007 | Ban et al. |
| 2004/0015367 A1 | 1/2004 | Nicastro et al. | 2007/0050308 A1 | 3/2007 | Latvala et al. |
| 2004/0034578 A1 | 2/2004 | Oney et al. | 2007/0075916 A1 | 4/2007 | Bump et al. |
| 2004/0054564 A1 | 3/2004 | Fonseca et al. | 2007/0094098 A1 | 4/2007 | Mayer et al. |
| 2004/0093268 A1 | 5/2004 | Ramchandani et al. | 2007/0094261 A1 | 4/2007 | Phelan et al. |
| 2004/0093381 A1 | 5/2004 | Hodges et al. | 2007/0129964 A1 | 6/2007 | Helmolt et al. |
| 2004/0111304 A1 | 6/2004 | Meka et al. | 2007/0129984 A1 | 6/2007 | von Helmolt et al. |
| 2004/0111639 A1 | 6/2004 | Schwartz et al. | 2007/0129985 A1 | 6/2007 | Helmolt et al. |
| 2004/0128180 A1 | 7/2004 | Abel et al. | 2007/0143164 A1 | 6/2007 | Kaila et al. |
| 2004/0133481 A1 | 7/2004 | Schwarze et al. | 2007/0150332 A1 | 6/2007 | Grichnik et al. |
| 2004/0153359 A1 | 8/2004 | Ho et al. | 2007/0150387 A1 | 6/2007 | Seubert et al. |
| 2004/0158506 A1 | 8/2004 | Wille | 2007/0150855 A1 | 6/2007 | Jeong |
| 2004/0172510 A1 | 9/2004 | Nagashima et al. | 2007/0156428 A1 | 7/2007 | Brecht-Tillinger et al. |
| 2004/0181470 A1 | 9/2004 | Grounds | 2007/0156430 A1 | 7/2007 | Kaetker et al. |
| 2004/0181538 A1 | 9/2004 | Lo et al. | 2007/0156474 A1 | 7/2007 | Scherberger et al. |
| 2004/0205011 A1 | 10/2004 | Northington et al. | 2007/0156475 A1 | 7/2007 | Berger et al. |
| 2004/0236639 A1 | 11/2004 | Candadai et al. | 2007/0156476 A1 | 7/2007 | Koegler et al. |
| 2004/0236687 A1 | 11/2004 | Tyson-Quah | 2007/0156482 A1 | 7/2007 | Bagheri |
| 2004/0243489 A1 | 12/2004 | Mitchell et al. | 2007/0156489 A1 | 7/2007 | Berger et al. |
| 2004/0254866 A1 | 12/2004 | Crumbach et al. | 2007/0156493 A1 | 7/2007 | Tebbe et al. |
| 2004/0255152 A1 | 12/2004 | Kanamori et al. | 2007/0156499 A1 | 7/2007 | Berger et al. |
| 2005/0010501 A1 | 1/2005 | Ward | 2007/0156500 A1 | 7/2007 | Merkel et al. |
| 2005/0033588 A1 | 2/2005 | Ruiz et al. | 2007/0156538 A1 | 7/2007 | Peter et al. |
| 2005/0044015 A1 | 2/2005 | Bracken et al. | 2007/0156550 A1 | 7/2007 | Der Emde et al. |
| 2005/0060235 A2 | 3/2005 | Byrne | 2007/0156731 A1 | 7/2007 | Ben-Zeev |
| 2005/0060408 A1 | 3/2005 | McIntyre et al. | 2007/0162893 A1* | 7/2007 | Moosmann et al. .......... 717/121 |
| 2005/0065828 A1 | 3/2005 | Kroswek et al. | 2007/0164849 A1 | 7/2007 | Haeberle et al. |
| 2005/0108680 A1* | 5/2005 | Cheng et al. ............... 717/104 | 2007/0168303 A1* | 7/2007 | Moosmann et al. .......... 705/400 |

| | | | |
|---|---|---|---|
| 2007/0174068 | A1 | 7/2007 | Alfandary et al. |
| 2007/0174145 | A1 | 7/2007 | Hetzer et al. |
| 2007/0174811 | A1 | 7/2007 | Kaetker et al. |
| 2007/0186209 | A1 | 8/2007 | Kaetker et al. |
| 2007/0197877 | A1 | 8/2007 | Decorte et al. |
| 2007/0198391 | A1* | 8/2007 | Dreyer et al. .................. 705/37 |
| 2007/0214065 | A1 | 9/2007 | Kahlon et al. |
| 2007/0220046 | A1* | 9/2007 | Moosmann et al. ....... 707/104.1 |
| 2007/0220143 | A1 | 9/2007 | Lund et al. |
| 2007/0233539 | A1 | 10/2007 | Suenderhauf et al. |
| 2007/0233541 | A1 | 10/2007 | Schorr et al. |
| 2007/0233545 | A1 | 10/2007 | Cala et al. |
| 2007/0233574 | A1 | 10/2007 | Koegler et al. |
| 2007/0233575 | A1 | 10/2007 | Berger et al. |
| 2007/0233581 | A1 | 10/2007 | Peter |
| 2007/0233598 | A1 | 10/2007 | Der Emde et al. |
| 2007/0234282 | A1 | 10/2007 | Prigge et al. |
| 2007/0239508 | A1 | 10/2007 | Fazal et al. |
| 2007/0239569 | A1 | 10/2007 | Lucas et al. |
| 2007/0265860 | A1 | 11/2007 | Herrmann et al. |
| 2007/0265862 | A1 | 11/2007 | Freund et al. |
| 2008/0004929 | A9 | 1/2008 | Raffel et al. |
| 2008/0017722 | A1 | 1/2008 | Snyder et al. |
| 2008/0027831 | A1 | 1/2008 | Gerhardt |
| 2008/0065437 | A1 | 3/2008 | Dybvig |
| 2008/0120129 | A1 | 5/2008 | Seubert et al. |
| 2008/0147507 | A1 | 6/2008 | Langhammer |
| 2008/0162382 | A1 | 7/2008 | Clayton et al. |
| 2008/0208707 | A1 | 8/2008 | Erbey et al. |
| 2008/0215354 | A1 | 9/2008 | Halverson et al. |
| 2008/0263152 | A1 | 10/2008 | Daniels et al. |
| 2008/0300959 | A1 | 12/2008 | Sinha et al. |
| 2009/0037287 | A1 | 2/2009 | Baitalmal et al. |
| 2009/0037492 | A1 | 2/2009 | Baitalmal et al. |
| 2009/0063112 | A1 | 3/2009 | Hader et al |
| 2009/0171716 | A1 | 7/2009 | Suenderhauf et al. |
| 2009/0171818 | A1 | 7/2009 | Penning et al. |
| 2009/0172699 | A1 | 7/2009 | Jungkind et al. |
| 2009/0189743 | A1 | 7/2009 | Abraham et al. |
| 2009/0192858 | A1 | 7/2009 | Johnson |
| 2010/0070324 | A1 | 3/2010 | Bock et al. |
| 2010/0070331 | A1 | 3/2010 | Koegler et al. |
| 2010/0070336 | A1 | 3/2010 | Koegler et al. |
| 2010/0070395 | A1 | 3/2010 | Elkeles et al. |
| 2010/0070555 | A1 | 3/2010 | Duparc et al. |
| 2010/0100464 | A1 | 4/2010 | Ellis et al. |
| 2010/0138269 | A1 | 6/2010 | Cirpus et al. |
| 2011/0252395 | A1 | 10/2011 | Charisius et al. |

FOREIGN PATENT DOCUMENTS

| | | |
|---|---|---|
| WO | WO 2004/083984 | 9/2004 |
| WO | WO 2005/114381 | 12/2005 |

OTHER PUBLICATIONS

Anon., "State of the art™ Reports 13,000 MAS 90® for Windows® Shipments in First Nine Months of Availability," PR Newswire, Apr. 28, 1997.*

Avery, S., "Buyers' Guide to Software for Purchasing 2000 (Directory)," Purchasing, vol. 129, No. 1, p. 179, Jul. 13, 2000.*

Notice of Allowance issued in U.S. Appl. No. 11/967,890 on Jul. 15, 2011; 10 pages.*

Notice of Allowance issued in U.S. Appl. No. 11/364,538 on Jul. 26, 2011; 7 pages.*

Aleksy, M. et al.; "Interoperability of Java-Based Applications and SAP's Business Framework State of the Art and Desirable Developments"; Proceedings of the International Symposium on Edinburgh, UK; Sep. 1999; IEEE Computer Soc.; pp. 190-200.

Arch-int, S. et al.; "Development of Industrial Information Systems on the Web Using Busienss Components"; Computers in Industry; vol. 60; 2003; pp. 231-250.

Astudillo, H.; "How Conceptual System Architecture Leads to Business Process"; ACM; 2000; pp. 35-36.

Avanquest's Bookkeeper 2007 Provides All-in-One Solution for Small Business Accounting and Financial Management; New Version of Popular Software Enables Detailed Report Creation and In-House Payroll Processing; PR Newswire; New York; Oct. 3, 2006.

Beisiegel, M. et al.; "Service Component Architecture: Building Systems Using a Service Oriented Architecture"; Whitepaper [online]; Nov. 2005; pp. 1-31; http://download.boulder.ibm.com/ibmdl/pub/software/dw/specs/ws-sca/SCA_White_Paper1_09.pdf.

Cowan, D.D. et al.; "Application Integration: Constructing Composite Applications from Interactive Components"; Software Practice and Experience; vol. 23, No. 3; Mar. 1993; pp. 255-275.

Deimel, A.; "The SAP R/3 Business Framework"; Software—Concepts & Tools; vol. 19, No. 1; 1998; pp. 29-36.

Fellner, K.J., et al.; "Classification Framework for Business Components"; System Sciences; Proceedings of the 33rd Annual Hawaii International Conference; Jan. 2000; pp. 3239-3248.

Ferguson D.F. et al.; "Service-Oriented Architecture: Programming Model and Product Architecture"; IBM Systems Journal [online]; vol. 44, No. 4; Dec. 1, 2005; pp. 753-780; http://researchweb.watson.ibm.com/journal/sj/444/ferguson.pdf.

Gauthier, P. and OSS-J Architecture Board; "OSS through Java (TM) J2EE Design Guidelines"; [online]; Oct. 31, 2001; http://www.ossj.org/downloads/design_guidelines.shtml.

Gessford, J.E.; "Object-Oriented System Design"; Emerging Information Technologies for Competitive Advantage and Economic Development; Proceedings of the 1992 Information Resources Management Association International Conference; 1992; pp. 110-118.

He, J. et al.; "Component-Based Software Engineering: The Need to Link Methods and Their Theories"; Theoretical Aspects of Computer ICTAC 2005; Second International Colloquium Proceedings (Lecture notes in Computer Science vol. 3722); Oct. 2005; pp. 70-95.

"Hudson's Bay Company Realizes Fast ROI with the Oracle E-Business Suite"; PR Newswire; New York; Jan. 15, 2002; p. 1.

Kozacynski, W.; "Architecture Framework for Business Components"; Software Reuse 1998 Proceedings; Fifth International Conferences on Victoria, BC, Canada; Jun. 1998; IEEE Comput. Soc; pp. 300-307.

Kythe, D.K.; "The Promise of Distributed Business Components"; Bell Labs Technical Journal; vol. 75, No. 2; Mar./Apr. 1999; pp. 20-28.

Linthicum, D.S.; "Chapter 9: RPCs, Messaging, and B2B Application Integration"; B2B Application Integration: E-Business Enable Your Enterprise; 2001; pp. 167-181.

Nori A.K. et al.; "Composite Applications: Process Based Application Development"; Lecture Notes in Computer Science; vol. 2444; Aug. 2003; pp. 48-53.

Pilhofer, F.; "Writing and Using CORBA Components"; Apr. 2002; http://www.fpx.de/MicoCCM/download/mico-ccm.pdf; 17 pages.

Ravichandran, T.; "Special Issue on Component-Based Software Development"; The Data Base for Advances in Information Systems; 2003; pp. 45-46.

SAP AG; "Designing Cross Solutions"; SAP XAPPS, [online]; Sep. 2003; pp. 1-2; http://www.sap.com/belux/platform/netweaver/pdf/BWP_CAF.pdf.

Schmid, H.A.; "Business Entity Components and Buisness Process Components"; Joop; vol. 12, No. 6; Oct. 1999; pp. 6-10, 12-15.

Sharifi, M. et al.; "CORBA Components Collocation Optimization Enhanced with Local ORB-Like Services Support"; On the Move to Meaningful Internet Systems (2004): COOPIS, ODA and ODBASE. OTM Confederated Conferences COOPIS, DOA and ODBASE 2004; Proceedings Part II (Lecture Notes in Computer Science vol. 3291); 2004; pp. 1143-1154.

Singh, I. et al.; "Designing Enterprise Applications with the J2EE Platform, Second Edition"; Jun. 15, 2002.

Stojanovic, Z. et al.; "Modeling and Design of Service-Oriented Architecture"; Systems, Man and Cybernetics; 2004 IEEE International Conference on The Hague, The Netherlands; Oct. 2004; IEEE, vol. 5; pp. 4147-4152.

Thomas, A.; "Enterprise JavaBeans Server Component Model for Java"; [online]; Dec. 1997; http://www.cs.indiana.edu/classes/b649-gann/ejb-white-paper.pdf.

Vergil Technology Ltd.; "Vergil Composite Application Builder Suite"; Product Datasheet [online]; 2003; pp. 1-5; http://www.webservicesmall.com.docs/VCAB_datasheet.pdf.

Woods, D.; "Packaged Composite Applications: A Liberating Force for the User Interface"; Internet Citation [online]; Oct. 2004; 4 pages; http://www.sapdesignguild.org/editions/edition7/print_composite applications.asp.

International Search Report and Written Opinion of the International Searching Authority issued in International Application No. PCT/EP2006/012625; Apr. 3, 2007; 8 pages.

International Preliminary Report on Patentability issued in International Application No. PCT/EP2006/012625; Jul. 1, 2008; 7 pages.

International Search Report and Written Opinion of the International Searching Authority issued in International Application No. PCT/EP2006/012614; Mar. 16, 2007; 7 pages.

International Preliminary Report on Patentability issued in International Application No. PCT/US2006/012614; Jul. 1, 2008; 6 pages.

International Search Report and Written Opinion of the International Searching Authority issued in International Application No. PCT/EP2006/012618; Apr. 3, 2007; 8 pages.

International Preliminary Report on Patentability issued in International Application No. PCT/EP2006/012618; Jul. 1, 2008; 7 pages.

International Search Report and Written Opinion of the International Searching Authority issued in International Application No. PCT/EP2006/012613; May 3, 2007; 6 pages.

International Preliminary Report on Patentability issued in International Application No. PCT/EP2006/012613; Jul. 1, 2008; 6 pages.

International Search Report and Written Opinion of the International Seaching Authority issued in International Application No. PCT/EP2006/012624; Mar. 30, 2007; 9 pages.

International Preliminary Report on Patentability issued in International Application No. PCT/EP2006/012624; Jul. 1, 2008; 8 pages.

International Search Report and Written Opinion of the International Seaching Authority issued in International Application No. PCT/EP2006/012623; May 7, 2007; 8 pages.

International Preliminary Report on Patentability issued in International Application No. PCT/EP2006/012623; Jul. 1, 2008; 7 pages.

International Search Report and Written Opinin of the International Searching Authority issued in International Application No. PCT/EP2006/012620; Mar. 21, 2007, 7 pages.

International Preliminary Report on Patentability issued in International Application No. PCT/EP2006/012620; Jul. 1, 2008; 6 pages.

International Search Report and Written Opinion of the International Searching Authority issued in International Application No. PCT/EP2006/012619; Apr. 19, 2007; 8 pages.

International Preliminary Report on Patentability issued in International Application No. PCT/EP2006/012619; Jul. 1, 2008; 7 pages.

International Search Report and Written Opinion of the International Searching Authority issued in International Application No. PCT/EP2006/012621; Apr. 19, 2007; 8 pages.

International Preliminary Report on Patentability issued in International Application No. PCT/EP2006/012621; Jul. 1, 2008; 7 pages.

International Seach Report and Written Opinion of the International Searching Authority issued in International Application No. PCT/EP2007/002835; Aug. 9, 2007; 12 pages.

International Preliminary Report on Patentability issued in International Application No. PCT/EP2007/002835; Sep. 30, 2008; 8 pages.

Communication Pursuant to Article 94(3) EPC issued in European Application No. 06841224.6; May 15, 2009; 8 pages.

Communication Pursuant to Article 94(3) EPC issued in European Application No. 06847009.5; May 15, 2009; 10 pages.

Communication Pursuant to Article 94(3) EPC issued in European Application No. 07007130.3; Dec. 5, 2008; 6 pages.

Extended European Search Report issued in European Application No. 07007130.3; Oct. 5, 2007; 6 pages.

Office Action issued in U.S. Appl. No. 11/323,041; Apr. 30, 2009; 26 pages.

Office Action issued in U.S. Appl. No. 11/322,612; May 11, 2009; 24 pages.

Office Action issued in U.S. Appl. No. 11/322,772; Mar. 25, 2009; 12 pages.

Office Action issued in U.S. Appl. No. 11/323,590; Jan. 9, 2009; 23 pages.

Office Action issued in U.S. Appl. No. 11/396,288; Jan. 2, 2009; 18 pages.

Office Action issued in U.S. Appl. No. 11/396,288; Apr. 15, 2008; 26 pages.

Office Action issued in U.S. Appl. No. 11/397,029; Jul. 21, 2009;28 pages.

Office Action issued in U.S. Appl. No. 11/323,040; Jul. 24, 2009; 35 pages.

Office Action issued in U.S. Appl. No. 11/323,590; Jul. 10, 2009; 32 pages.

Office Action issued in U.S. Appl. No. 11/322,816; Jul. 23, 2006; 41 pages.

Office Action issued in U.S. Appl. No. 11/322,851; Sep. 2, 2009; 32 pages.

Office Action issued in U.S. Appl. No. 11/323,590; Dec. 30, 2009; 31 pages.

Office Action issued in U.S. Appl. No. 11/322,482; Jan. 7, 2010; 19 pages.

Office Action issued in U.S. Appl. No. 11/322,772; Dec. 9, 2009; 14 pages.

Office Action issued in U.S. Appl. No. 11/323,039; Sep. 4, 2009; 36 pages.

Office Action issued in U.S. Appl. No. 11/323,634; Sep. 10, 2009; 15 pages.

Office Action issued in U.S. Appl. No. 11/322,383; Nov. 12, 2009; 29 pages.

Office Action issued in U.S. Appl. No. 12/333,085; Jun. 25, 2009; 9 pages.

Office Action issued in U.S. Appl. No. 11/396,288; Aug. 19, 2009; 20 pages.

"American Software Announces ASP Pricing Model for It's a—Applications Expense Business Solution"; PR Newswire; Mar. 6, 2000; 2 pages.

Bastani et al.; "Complex Open System Design by Quasi Agents: Process Oriented Modeling in Agent Based Systems"; ACM SIGSOFT; vol. 34, No. 4; 2009; pp. 1-14.

Bastani et al.; "Process Oriented Abstraction of the Complex Evolvable Systems: Problem Model Construction"; ACM SIGSOFT; vol. 33, No. 3; 2008; pp. 1-13.

"Cendant Announces Comprehensive Online Travel Booking to Meet President Bush's eTravel Initiative"; PR Newswire; Jul. 9, 2002; 3 pages.

Chen, M. And Meixell, M.; "Web Services Enabled Procurement in the Extended Enterprise: An Architectural Design and Implementation"; Journal of Electronic Commerce Research, vol. 4, No. 4; 2003; pp. 140-155.

Duc et al.; "Uniform Object Modeling Methodology and Reuse of Real Time System Using UML"; EMSOFT '05; Sep. 19-22, 2005; pp. 44-47.

Gomaa et al.; "Model Based Software Design and Adaption"; International Workshop on Software Engineering for Adaptive and Self-Managing Systems (SEAMS '07); IEEE; 2007; 10 pages.

Huang, S. et al.; "Computer-Assisted Supply Chain Configuration Based on Supply Chain Operations Reference (SCOR) Model"; Computers & Industrial Engineering 48; 2005; pp. 377-394.

Intuit Canada Ltd.; "Startup Guide—QuickBooks Basic for Windows, QuickBooks Pro for Windows, QuickBooks Premier for Windows"; 2002; 230 pages.

Lambert et al.; "Supply Chain Metrics"; International Journal of Logistics Management; vol. 12, No. 1; 2001; pp. 1-19.

Lockamy III, et al.; "Linking SCOR Planning Practices to Supply Chain Performance"; International Journal of Operationgs & Production Management; vol. 24, No. 12; pp. 1192-1218.

mySAP™ ERP 2005; Downloaded Mar. 24, 2010 from <http://web.archive.org/web/20061104021205/www.sap.com/solutions/business-suite/erp/pdf/BWP_mySAP_ERP_2005.pdf>; 60 pages.

"Oracle Expands E-Commerce Offerings with the Acquisition of E-Travel, Inc."; PR Newswire; Mar. 9, 1999; 3 pages.

Ouyang et al.; "From Business Process Models to Process Oriented Software Systems"; ACM Transactions on Software Engineering and Methodology; vol. 19, No. 1, Article 2; Aug. 2009; pp. 1-37.

Rossi et al.; "Designing and Architecturing Process-aware Web Applications with EPML"; SAC '08; Mar. 16-20, 2008; pp. 2409-2414.

"SAP Delivers Next-generation ERP to Customers"; PR Newswire; New York; Mar. 10, 2005; 7 pages.

Schultz, G.J.; "Keeping SCOR on Your Supply Chain: Basic Operations Reference Model Updates with the Times"; Information Strategy: The Executive's Journal; Summer 2003; pp. 12-20.

Stephens, S.; "Supply Chain Council & Supply Chain Operations Reference (SCOR) Model Overview"; <http://www.supply-chain.org>; Version 5.0a; Aug. 2001; 29 pages.

Stephens, S.; "Supply Chain Operatives Reference Model Version 5.0: A New Tool to Improve Supply Chain Efficiency and Achieve Best Practice"; Information Systems Frontiers 3:4, 2001; pp. 471-476.

"Time Management with mySAP™ ERP Human Capital Management"; Downloaded Mar. 24, 2010 from <http://web.archive.org/web/20060105084834/www.sap.com/solutions/busine ss-suite/erp/hcm/pdf/HCM_Time_Management.pdf>; 4 pages.

Vogel et al.; "mySAP ERP for Dummies"; Published on Sep. 30, 2005; Downloaded on Mar. 23, 2001 from <http://proquest.safaribooksonline.com/9780764599958> 41 pages.

International Search Report and Written Opinion of the International Searching Authority issued in International Application No. PCT/EP2007/002841; Aug. 16, 2007; 12 pages.

International Preliminary Report on Patentability under Chapter I issued in International Application No. PCT/EP2007/002841; Sep. 30, 2008; 8 pages.

Office Action issued in U.S. Appl. No. 11/396,312 on Mar. 30, 2010; 23 pages.

Office Action issued in U.S. Appl. No. 11/322,611 on Mar. 31, 2010; 17 pages.

Notice of Allowance issued in U.S. Appl. No. 11/322,610 on Mar. 1, 2010; 12 pages.

Notice of Allowance issued in U.S. Appl. No. 11/322,610 on Jun. 14, 2010; 6 pages.

Office Action issued in U.S. Appl. No. 11/322,398 on Apr. 2, 2010; 39 pages.

Office Action issued in U.S. Appl. No. 11/322,383; May 12, 2010; 23 pages.

Office Action issued in U.S. Appl. No. 11/322,382 on Mar. 29, 2010; 28 pages.

Office Action issued in U.S. Appl. No. 11/323,041 on Mar. 19, 2010; 26 pages.

Advisory Action issued in U.S. Appl. No. 11/323,041 on Jun. 7, 2010; 3 pages.

Notice of Allowance issued in U.S. Appl. No. 11/396,259 on Mar. 29, 2010; 19 pages.

Notice of Allowance issued in U.S. Appl. No. 11/396,288; May 20, 2010; 15 pages.

Office Action issued in U.S. Appl. No. 11/396,236 on Mar. 31, 2010; 20 pages.

Office Action issued in U.S. Appl. No. 11/323,039; Apr. 14, 2010; 15 pages.

Office Action issued in U.S. Appl. No. 11/322,851; May 12, 2010; 15 pages.

Office Action issued in U.S. Appl. No. 11/323,040; Apr. 29, 2010; 17 pages.

Office Action issued in U.S. Appl. No. 11/322,612; Apr. 1, 2010; 23 pages.

Advisory Action issued in U.S. Appl. No. 11/322,612; Jun. 24, 2010; 3 pages.

Notice of Allowance issued in U.S. Appl. No. 11/397,026 on Mar. 29, 2010; 17 pages.

Notice of Allowance issued in U.S. Appl. No. 12/233,554 on May 14, 2010; 11 pages.

Notice of Allowance issued in U.S. Appl. No. 12/233,534 on Jun. 24, 2010; 15 pages.

Notice of Allowance issued in U.S. Appl. No. 12/327,354 on Jun. 25, 2010; 16 pages.

Notice of Allowance issued in U.S. Appl. No. 11/967,865 on Mar. 31, 2010; 16 pages.

Office Action issued in U.S. Appl. No. 11/323,590; Jun. 21, 2010; 25 pages.

Office Action issued in U.S. Appl. No. 11/323,634; Apr. 2, 2010; 9 pages.

Office Action issued in U.S. Appl. No. 11/322,816; Apr. 15, 2010; 27 pages.

Office Action issued in U.S. Appl. No. 11/396,327 on Apr. 1, 2010; 26 pages.

Office Action issued in U.S. Appl. No. 12/333,085; Mar. 23, 2010; 5 pages.

Cascallar, Eduardo et al.; "Assessment in the Evaluation of Self-Regulation as a Process"; Educational Psychology Review; vol. 18, No. 3; Sep. 2006; pp. 297-306.

Cool, David W.; "Activity Fund Accounting"; School Business Affairs; vol. 49, No. 6; Jun. 1983; pp. 50-52.

Office Action issued in U.S. Appl. No. 11/396,312 on Sep. 10, 2010; 23 pages.

Office Action issued in U.S. Appl. No. 11/322,611 on Sep. 16, 2010; 21 pages.

Notice of Allowance issued in U.S. Appl. No. 11/322,610 on Sep. 23, 2010; 6 pages.

Office Action issued in U.S. Appl. No. 11/322,772; Jul. 12, 2010; 18 pages.

Notice of Allowance issued in U.S. Appl. No. 11/322,398 on Jul. 23, 2010; 38 pages.

Notice of Allowance issued in U.S. Appl. No. 1/322,382 on Sep. 20, 2010; 6 pages.

Notice of Allowance issued in U.S. Appl. No. 11/396,259 on Jul. 6, 2010; 6 pages.

Notice of Allowance issued in U.S. Appl. No. 11/396,259 on Oct. 15, 2010; 6 pages.

Notice of Allowance issued in U.S. Appl. No. 11/396,288; Sep. 24, 2010; 4 pages.

Office Action issued in U.S. Appl. No. 11/396,250 on Oct. 18, 2010; 15 pages.

Office Action issued in U.S. Appl. No. 11/322,845; Jul. 15, 2010; 16 pages.

Supplemental Notice of Allowance issued in U.S. Appl. No. 11/397,026 on Jul. 9, 2010; 4 pages.

Notice of Allowance issued in U.S. Appl. No. 11/397,026 on Jul. 26, 2010; 6 pages.

Notice of Allowance issued in U.S. Appl. No. 12/233,554 on Sep. 17, 2010; 10 pages.

Notice of Allowance issued in U.S. Appl. No. 11/968,054 on Sep. 7, 2010; 11 pages.

Office Action issued in U.S. Appl. No. 12/233,557 on Sep. 16, 2010; 16 pages.

Notice of Allowance issued in U.S. Appl. No. 12/233,534 on Oct. 20, 2010; 15 pages.

Notice of Allowance issued in U.S. Appl. No. 12/327,354 on Oct. 18, 2010; 16 pages.

Notice of Allowance issued in U.S. Appl. No. 11/967,865 on Oct. 6, 2010; 6 pages.

Notice of Allowance issued in U.S. Appl. No. 11/322,482; Jul. 13, 2010; 5 pages.

Office Action issued in U.S. Appl. No. 11/967,483; Aug. 20, 2010; 10 pages.

Notice of Allowance issued in U.S. Appl. No. 12/333,085; Sep. 13, 2010; 8 pages.

Ferscha et al.; "A Light-Weight Component Model for Peer-to-Peer Applications"; IEEE; Mar. 23, 2004.

Flissi et al.; "A Component-based Software Infrastructure for Ubiquitous Computing"; IEEE; Jul. 4, 2005.

Gould; "Integrating the Manufacturing Enterprise"; Automative Design & Production; 119, 1; ABI/INFORM Global; Jan. 2007; 3 pages.

Papazoglou et al; "Service-Oriented Computing Research Road Map"; http://infolab.uvt.nl/pub/papazogloump-2006-96.pdf; Mar. 1, 2006; 29 pages.

SAP AG; "SAP NetWeaver Visual Composer: User Guide (SAP NetWeaver Visual Composer release 6.0)"; Document version 1.1; pp. 1-208, Copyright 2004.

SAP AG; "Powered by SAP NetWeaver Partner Program—Frequently Asked Questions"; May 2005; 10 pages [online] http://www.lionbridge.com/NR/rdonlyres/4940BE1F/DA46/412E/AB16/F049BD865CA1/0/PBMW FAQ_50070686_en.pdf.

Strelich, Thomas P. et al.; "Simulation-Based Transformation with the Service Integration/Interoperation Infrastructure"; Technology Review Journal; Fall/Winter 2005; pp. 99-115.
Notice of Allowance issued in U.S. Appl. No. 11/322,610 on Dec. 22, 2010; 6 pages.
Notice of Allowance issued in U.S. Appl. No. 11/322,398 on Oct. 29, 2010; 18 pages.
Notice of Allowanced issued in U.S. Appl. No. 11/322,398 on Nov. 15, 2010; 20 pages.
Notice of Allowance issued in U.S. Appl. No. 1/322,382 on Jan. 6, 2011; 7 pages.
Notice of Allowance issued in U.S. Appl. No. 11/396,259 on Jan. 20, 2011; 6 pages.
Notice of Allowance issued in U.S. Appl. No. 11/396,288; Dec. 28, 2010; 4 pages.
Office Action issued in U.S. Appl. No. 11/396,236 on Oct. 28, 2010; 19 pages.
Notice of Allowance issued in U.S. Appl. No. 11/322,845; Dec. 27, 2010; 16 pages.
Office Action issued in U.S. Appl. No. 11/323,040 on Nov. 5, 2010; 33 pages.
Notice of Allowance issued in U.S. Appl. No. 11/397,026 on Nov. 15, 2010; 7 pages.
Office Action issued in U.S. Appl. No. 12/233,550 on Jan. 12, 2011; 29 pages.
Notice of Allowance issued in U.S. Appl. No. 12/233,534 on Jan. 31, 2011; 15 pages.
Notice of Allowance issued in U.S. Appl. No. 12/327,354 on Feb. 1, 2011; 16 pages.
Office Action issued in U.S. Appl. No. 11/322,973 on Dec. 7, 2010; 13 pages.
Notice of Allowance issued in U.S. Appl. No. 11/396,327 on Nov. 30, 2010; 28 pages.
Office Action issued in U.S. Appl. No. 11/404,147 on Nov. 24, 2010; 27 pages.
Notice of Allowance issued in U.S. Appl. No. 12/233,462 on Feb. 2, 2011; 11 pages.
Bin et al.; "Component Model Optimization for Distributed Real-Time Embedded Software"; IEEE International Conference on Systems, Man and Cybernetics; Oct. 13, 2004; 6 pages.
Cohen; "Optimizer: IBM's Multi-Echelon Inventory System for Managing Service Logistics Interfaces"; vol. 20, No. 1; 1990; pp. 65-82.
Cohen et al.; "Saturn's Supply-Chain Innovation: High Value in After Sales Service"; Sloan Management Review; vol. 41, No. 4; 2000; pp. 93-101.
Cox et al.; "A Formal Model for Component Based Software"; IEEE; Aug. 7, 2002; 8 pages.
Finin et al.; "KQML as an Agent Communication Language"; retrieved on Jul. 26, 2011; pp. 456-463. <http://portal.acm.org/citation.cfm?id=191322>.
Jennings et al.; "Autonomous Agents for Business Process Management"; 2000 Applied Artificial Intelligence; retrieved on Jul. 25, 2011; pp. 145-189. <http://citeseerx.ist.psu.edu/viewdoc/download?doi=10.1.1.58.624&rep=repl<ype=pdf>.
Kalakota et al.; "Readings in Electronic Commerce"; Addison-Wesley Longman, Inc.; 1995; ISBN: 0-201-88060-1.
Orsburn; "Spares Management Handbook"; McGrawHill; 1991; ISBN: 0-8306-7626-0.
Notice of Allowance issued in U.S. Appl. No. 12/233,554 on Feb. 22, 2011; 7 pages.
Notice of Allowance issued in U.S. Appl. No. 12/233,554 on Jun. 27, 2011; 7 pages.
Notice of Allowance issued in U.S. Appl. No. 12/233,550 on May 11, 2011; 20 pages.
Office Action issued in U.S. Appl. No. 12/333,146 on Sep. 6, 2011; 21 pages.
Office Action issued in U.S. Appl. No. 11/323,634 on Apr. 29, 2011; 8 pages.
Office Action issued in U.S. Appl. No. 11/322,973 on May 27, 2011; 15 pages.
Office Action issued in U.S. Appl. No. 11/404,147 on Aug. 4, 2011; 26 pages.
Notice of Allowance issued in U.S. Appl. No. 12/233,462 on May 18, 2011; 6 pages.
Office Action issued in U.S. Appl. No. 12/233,457 on May 26, 2011; 19 pages.
Office Action issued in U.S. Appl. No. 11/967,483 on Mar. 4, 2011; 6 pages.
Office Action issued in U.S. Appl. No. 12/327,232 on May 26, 2011; 20 pages.
Office Action issued in U.S. Appl. No. 12/327,590 on Jun. 23, 2011; 16 pages.
Office Action issued in U.S. Appl. No. 12/233,087 on Aug. 18, 2011; 42 pages.
Notice of Allowance issued in U.S. Appl. No. 12/233,534 on May 16, 2011; 12 pages.
Notice of Allowance issued in U.S. Appl. No. 11/322,382 on Jul. 25, 2011; 5 pages.
Notice of Allowance issued in U.S. Appl. No. 11/322,610 on Mar. 31, 2011; 6 pages.
Notice of Allowanced issued in U.S. Appl. No. 11/322,398 on May 27, 2011; 21 pages.
Notice of Allowance issued in U.S. Appl. No. 11/396,250 on Mar. 2, 2011; 13 pages.
Notice of Allowance issued in U.S. Appl. No. 11/396,250 on Jun. 24, 2011; 5 pages.
Notice of Allowance issued in U.S. Appl. No. 11/322,845; Apr. 8, 2011; 8 pages.
Office Action issued in U.S. Appl. No. 11/323,040 on Jul. 26, 2011; 34 pages.
Notice of Allowance issued in U.S. Appl. No. 11/397,026 on Mar. 3, 2011; 6 pages.
Notice of Allowance issued in U.S. Appl. No. 11/397,026 on Jul. 20, 2011; 8 pages, Includes 3 pages of associated documents, 11 total.
Office Action issued in U.S. Appl. No. 12/233,417 on Apr. 7, 2011; 32 pages.
Office Action issued in U.S. Appl. No. 12/233,530 on Apr. 29, 2011; 11 pages.
Office Action issued in U.S. Appl. No. 11/967,405 on Apr. 27, 2011; 15 pages.
Office Action issued in U.S. Appl. No. 12/233,557 on Mar. 4, 2011; 19 pages.
Office Action issued in U.S. Appl. No. 12/233,489 on May 13, 2011; 15 pages.
Office Action issued in U.S. Appl. No. 11/967,393 o n Apr. 15, 2011; 12 pages.
Office Action issued in U.S. Appl. No. 11/967,387 on Sep. 8, 2011; 14 pages.
Office Action issued in U.S. Appl. No. 12/233,075 on Aug. 4, 2011; 45 pages.
Notice of Allowance issued in U.S. Appl. No. 11/967,865 on Jun. 24, 2011; 8 pages.
Anonymous; "Mastering Management"; Motor Age, vol. 25, No. 10; Oct. 2006; pp. 1-3.
Gerin et al.; "Flexible and Executable Hardware/Software Interface Modeling for Multiprocessor SOC Design Using SystemC"; IEEE; 2007; pp. 390-395.
Hahn; "A Domain Specific Modeling Language for Multi-Agent Systems"; ACM AAMAS; 2008; pp. 233-240.
Hu; "A Co-Design Modeling Approach for Computer Network Systems"; IEEE; 2007; pp. 685-693.
"IDe Partners with Journyx to Offer Customers Best-in-Class Time Management Solution"; PR Newswire; Mar. 8, 2005; Business Dateline.
Kremic, Tibor; "Outsourcing Decision Support: A Survey of Benefits, Risks, and Decision Factor"; Supply Chain Management; V. 11; 2006; pp. 467-482.
Meseroll, Robert; "Data Mining Navy Flight"; IEEE Autotestcom 2007; Sep. 2007; pp. 476- 481.
Sarjoughian et al.; "CoSMOs: A Visual Environment for Component Based Modeling, Experimental Design and Simulation"; ACM; 2009; pp. 1-9.
Schaub, Thomas et al.; "Enterprise Management Application Providing Availability Control Checks on Revenue Budgets"; Aerospace &

High Technology, ANTE: Abstracts in New Technologies and Engineering; Metdex, Mechanical & Transportation Engineering Abstracts; Date Unknown. p. 1.

"Trakware Systems Inc. Expands Management Team: Leading To-Order Software Provider Adds Experienced Global VP Sales and Marketing to its World-Class Team"; Canada NewsWire; Apr. 9, 2008.

Trappey, Amy; "Design and Analysis of a Rule Based Knowledge"; International Journal of Manufacturing Tech; Dec. 2007; 35,3-4:385-93.

Vescovi, Marcos and Hagmann, Christian; "Rules Engine for Enterprise System"; Areospace & High Technology, ANTE: Abstracts in New Technologies and Engineering; Metadex, Mechanical & Transportation Engineering Abstracts; Date Unknown; p. 1.

Notice of Allowance issued in U.S. Appl. No. 12/233,550 on Jan. 9, 2012; 11 pages.

Office Action issued in U.S. Appl. No. 12/333,146 on Feb. 2, 2012; 21 pages.

Notice of Allowance issued in U.S. Appl. No. 11/323,634 on Jan. 25, 2012; 5 pages.

Notice of Allowance issued in U.S. Appl. No. 11/396,327 on Sep. 28, 2011; 31 pages.

Office Action issued in U.S. Appl. No. 12/233,479 on Oct. 27, 2011; 24 pages.

Office Action issued in U.S. Appl. No. 12/332,965 on Oct. 11, 2011; 6 pages.

Notice of Allowance issued in U.S. Appl. No. 12/233,462 on Sep. 2, 2011; 7 pages.

Notice of Allowance in U.S. Appl. No. 12/233,462 on Dec. 12, 2011; 6 pages.

Notice of Allowance in U.S. Appl. No. 12/233,462 on Apr. 5, 2012; 7 pages.

Office Action issued in U.S. Appl. No. 12/233,289 on Oct. 27, 2011; 15 pages.

Notice of Allowance issued in U.S. Appl. No. 12/233,289 on Feb. 15, 2012; 11 pages.

Notice of Allowance issued in U.S. Appl. No. 12/233,457 on Nov. 3, 2011; 12 pages.

Notice of Allowance issued in U.S. Appl. No. 12/327,232 on Nov. 2, 2011; 16 pages.

Notice of Allowance issued in U.S. Appl. No. 12/327,590 on Dec. 28, 2011; 10 pages.

Office Action issued in U.S. Appl. No. 12/327,701 on Nov. 8, 2011; 20 pages.

Notice of Allowance issued in U.S. Appl. No. 12/327,701 on Apr. 6, 2012; 9 pages.

Notice of Allowance issued in U.S. Appl. No. 12/233,087 on Mar. 30, 2012; 30 pages.

Notice of Allowance issued in U.S. Appl. No. 12/233,534 won Dec. 28, 2011; 7 pages.

Notice of Allowanced issued in U.S. Appl. No. 11/322,398 on Oct. 18, 2011; 7 pages.

Examiner's Answer to Appeal Brief issued in U.S. Appl. No. 11/396,236 on Nov. 10, 2011; 19 pages.

Notice of Allowance issued in U.S. Appl. No. 11/396,259 on Aug. 5, 2011; 7 pages.

Notice of Allowance issued in U.S. Appl. No. 11/396,259 on Mar. 15, 2012; 7 pages.

Office Action issued in U.S. Appl. No. 11/396,288 on Oct. 17, 2011; 38 pages.

Notice of Allowance issued in U.S. Appl. No. 11/396,250 on Dec. 7, 2011; 6 pages.

Office Action issued in U.S. Appl. No. 11/396,252 on Nov. 10, 2011; 18 pages.

Notice of Allowance issued in U.S. Appl. No. 11/322,851 on Sep. 2, 2011; 8 pages.

Notice of Allowance issued in U.S. Appl. No. 11/322,851 on Mar. 1, 2012; 9 pages.

Notice of Allowance issued in U.S. Appl. No. 11/322,845; 9 pages, Nov. 3, 2011.

Notice of Allowance issued in U.S. Appl. No. 11/397,026 on Nov. 4, 2011; 8 pages.

Notice of Allowance issued in U.S. Appl. No. 11/397,026 on Feb. 23, 2012; 8 pages.

Notice of Allowance issued in U.S. Appl. No. 12/233,520 on Nov. 10, 2011; 22 pages.

Notice of Allowance issued in U.S. Appl. No. 12/233,417 on Sep. 14, 2011; 11 pages.

Notice of Allowance issued in U.S. Appl. No. 11/968,054 on Aug. 2, 2011; 5 pages.

Office Action issued in U.S. Appl. No. 12/233,458 on Oct. 12, 2011; 19 pages.

Office Action issued in U.S. Appl. No. 11/967,489 on Sep. 28, 2011; 7 pages.

Office Action issued in U.S. Appl. No. 11/967,489 on Feb. 6, 2012; 9 pages.

Notice of Allowance issued in U.S. Appl. No. 11/967,393 on Nov. 9, 2011; 9 pages.

Notice of Allowance issued in U.S. Appl. No. 12/327,354 on Aug. 9, 2011; 13 pages.

Office Action issued in U.S. Appl. No. 12/327,737 on Mar. 26, 2012; 14 pages.

Notice of Allowance issued in U.S. Appl. No. 12/233,075 on Mar. 22, 2012; 25 pages.

* cited by examiner

PROVIDING SUPPLIER RELATIONSHIP MANAGEMENT SOFTWARE APPLICATION AS ENTERPRISE SERVICES

BACKGROUND

This specification relates to data processing systems implemented on computers, and more particular to data processing systems providing services in the nature of web services.

Enterprise software systems are generally large and complex. Such systems can require many different components, distributed across many different hardware platforms, possibly in several different geographical locations. Thus, the architecture of a large software application, i.e., what its components are and how they fit together, is an important aspect of its design for a successful implementation.

Web services are one technology for making the functionality of software applications available to other software, including other applications. A web service is a standards-based way of encapsulating the functionality of an application that other applications can locate and access. A service-oriented architecture is a distributed software model within which functionality is defined as independent web services. Within a service-oriented architecture, web services can be used in defined sequences according to business logic to form applications that enable business processes.

SUMMARY

This specification describes a services architecture design that provides enterprise services having supplier relationship management functionality at the level of an enterprise application. Enterprise services are web services that have an enterprise-level business value.

In its various aspects, the invention can be embodied in systems, methods, and computer program products. For example, a system in one embodiment implements a services architecture design that provides enterprise services having supplier relationship management functionality at the level of an enterprise application. The design includes a set of service operations, process components, and optionally deployment units. Suitable business objects are also described.

The subject matter described in this specification can be implemented to realize one or more of the following advantages. Effective use is made of process components as units of software reuse, to provide a design that can be implemented reliably in a cost effective way. Effective use is made of deployment units, each of which is deployable on a separate computer hardware platform independent of every other deployment unit, to provide a scalable design. Service interfaces of the process components define a pair-wise interaction between pairs of process components that are in different deployment units in a scalable way.

Details of one or more implementations of the subject matter described in this specification are set forth in the accompanying drawings and in the description below. Further features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1A:
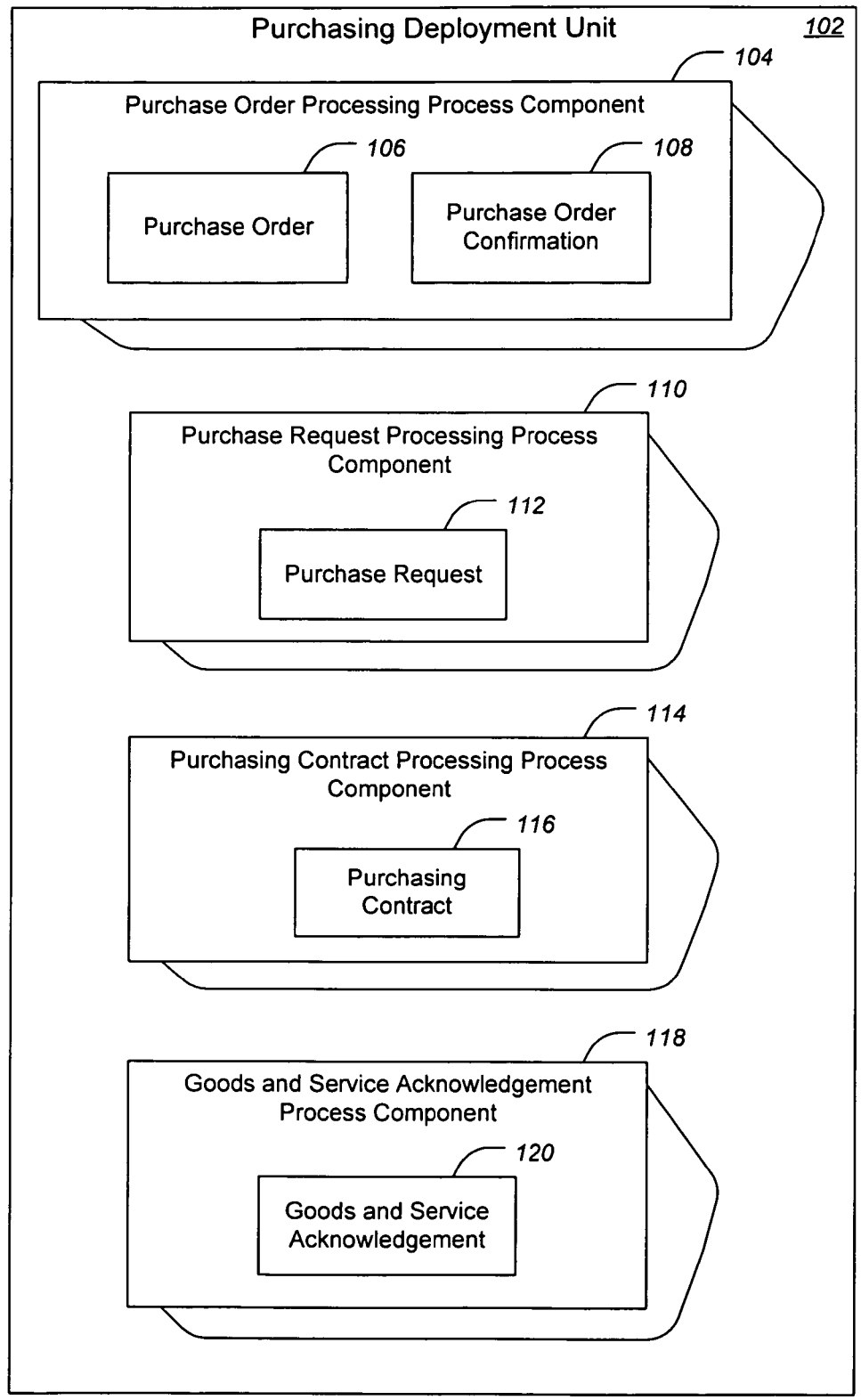
FIGS. 1A and 1B collectively illustrate a high-level view of a software architectural design and implementation of a suite of enterprise software services having supplier relationship management functionality.
Figure 1B:
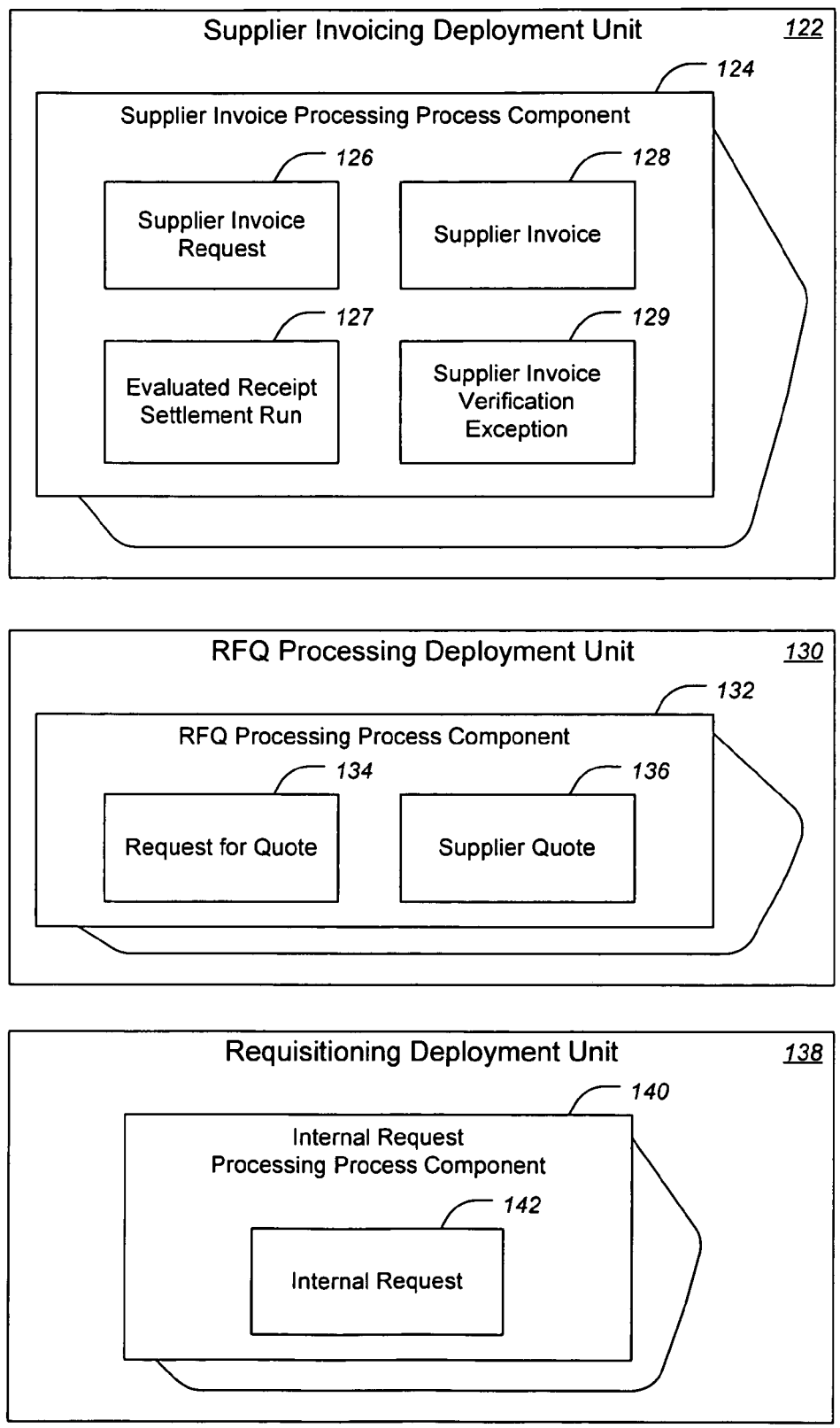

FIGS. 1A and 1B collectively illustrate a high-level view of a software architectural design, and of application software implementations of the design, that provides a suite of enterprise service operations, which can be organized into interfaces, having supplier relationship management application functionality.

The elements of the architecture include the business object, the process component, the service operation (or simply, the operation), the service interface, the message, and the deployment unit. The elements can also include process agents and reuse service components. These will be generally described below.

In one implementation, the software is implemented to be deployed on an application platform that includes a foundation layer that contains all fundamental entities that can used from multiple deployment units. These entities can be process components, business objects or reuse service components. A reuse service component is a piece of software that is reused in different transactions. A reuse service component is used by its defined interfaces, which can be, e.g., local APIs (Application Programming Interfaces) or service interfaces.

The architectural design is a specification of a computer software application, and elements of the architectural design can be implemented to realize a software application that implements enterprise application service interfaces. The elements of the architecture are at times described in this specification as being contained or included in other elements; for example, a process component is described as being contained in a deployment unit. It should be understood, however, that such operational inclusion can be realized in a variety of ways and is not limited to a physical inclusion of the entirety of one element in another.

The architectural elements include the business object. A business object is a representation of a type of a uniquely identifiable business entity (an object instance) described by a structural model. Processes operate on business objects.

A business object represents a specific view on some well-defined business content. A business object represents content, and instances of business objects include content, which a typical business user would expect and understand with little explanation. Whether an object as a type or an instance of an object is intended by the term is generally clear from the context, so the distinction will be made explicitly only when necessary. Properly implemented, business objects are implemented free of redundancies.

Business objects are further categorized as business process objects and, master data objects, mass data run objects, dependent objects, and transformed objects. A master data object is an object that encapsulates master data (i.e., data that is valid for a period of time). A business process object, which is the kind of business object generally found in a process component, is an object that encapsulates transactional data (i.e., data that is valid for a point in time). A mass data run object is an application object that executes an algorithm for a particular mass data run. An instance of a mass data run object contains a particular set of selections and parameters. A mass data run object implements an algorithm that modifies, manages, and/or processes a large amount of data in multiple transactions, possibly but not necessarily with parallel processing. A dependent object is a business object used as a reuse part in another business object. A dependent object represents a concept that cannot stand by itself from a business point of view. Instances of dependent objects only occur in the context of a non-dependent business object. A transformed object is a transformation of multiple business objects for a well-defined purpose. It transforms the structure of multiple business objects into a common structure. A transformed object does not have its own persistency. The term business object will be used generically to refer to a business process object and a master data object, unless the context requires otherwise. Properly implemented, business objects are implemented free of redundancies.

The architectural elements also include the process component. A process component is a software package that realizes a business process and generally exposes its functionality as services. The functionality contains business transactions. A process component contains one or more semantically related business objects. Any business object belongs to no more than one process component.

Process components are modular and context-independent. That they are context-independent means that a process component is not specific to any specific application and is reusable. The process component is the smallest (most granular) element of reuse in the architecture.

The architectural elements also include the operation. An operation belongs to exactly one process component. A process component generally has multiple operations. Operations can be synchronous or asynchronous, corresponding to synchronous or asynchronous process agents, which will be described below. An operation is the smallest, separately-callable function, described by a set of data types used as input, output, and fault parameters, or some combination of them, serving as a signature. For convenience in supporting use of the operations supported by a system implementing elements of the design, such a system can optionally include a repository of service descriptions that includes a standards-based description of each of the supported service operations.

The architectural elements also include the service interface, which may be referred to simply as an interface. An interface is a named group of operations. Each operation belongs to exactly one interface. An interface belongs to exactly one process component. A process component might contain multiple interfaces. In one implementation, an interface contains only inbound or outbound operations, but not a mixture of both. One interface can contain both synchronous and asynchronous operations. All operations of the same type (either inbound or outbound) which belong to the same message choreography will preferably belong to the same interface. Thus, generally, all outbound operations to the same other process component are in one interface.

The architectural elements also include the message. Operations transmit and receive messages. Any convenient messaging infrastructure can be used. A message is information conveyed from one process component instance to another, with the expectation that activity will ensue. An operation can use multiple message types for inbound, outbound, or error messages. When two process components are in different deployment units, invocation of an operation of one process component by the other process component is accomplished by an operation on the other process component sending a message to the first process component.

The architectural elements also include the process agent. Process agents do business processing that involves the sending or receiving of messages. Each operation will generally have at least one associated process agent. A process agent can be associated with one or more operations. Process agents can be either inbound or outbound, and either synchronous or asynchronous.

Asynchronous outbound process agents are called after a business object changes, e.g., after a create, update, or delete of a business object instance.

Synchronous outbound process agents are generally triggered directly by a business object.

An output process agent will generally perform some processing of the data of the business object instance whose change triggered the event. An outbound agent triggers subsequent business process steps by sending messages using well-defined outbound services to another process component, which generally will be in another deployment unit, or to an external system. An outbound process agent is linked to the one business object that triggers the agent, but it is sent not to another business object but rather to another process component. Thus, the outbound process agent can be implemented without knowledge of the exact business object design of the recipient process component.

Inbound process agents are called after a message has been received. Inbound process agents are used for the inbound part of a message-based communication. An inbound process agent starts the execution of the business process step requested in a message by creating or updating one or multiple business object instances. An inbound process agent is not the agent of a business object but of its process component. An inbound process agent can act on multiple business objects in a process component.

Synchronous agents are used when a process component requires a more or less immediate response from another process component, and is waiting for that response to continue its work.

Operations and process components are described in this specification in terms of process agents. However, in alternative implementations, process components and operations can be implemented without use of agents using other conventional techniques to perform the functions described in this specification.

The architectural elements also include the deployment unit. A deployment unit includes one or more process components and, optionally, one or more business objects, that are deployed together on a single computer system platform. Conversely, separate deployment units can be deployed on separate physical computing systems. For this reason, a deployment unit boundary defines the limits of an application-defined transaction, i.e., a set of actions that have the ACID properties of atomicity, consistency, isolation, and durability. To make use of database manager facilities, the architecture requires that all operations of such a transaction be performed on one physical database; as a consequence, the processes of such a transaction must be performed by the process components of one instance of one deployment unit.

The process components of one deployment unit interact with those of another deployment unit using messages passed through one or more data communication networks or other suitable communication channels. Thus, a deployment unit deployed on a platform belonging one business can interact with a deployment unit software entity deployed on a separate platform belonging to a different and unrelated business, allowing for business-to-business communication. More than one instance of a given deployment unit can execute at the same time, on the same computing system or on separate physical computing systems. This arrangement allows the functionality offered by a deployment unit to be scaled to meet demand by creating as many instances as needed.

Since interaction between deployment units is through service operations, a deployment unit can be replaced by other another deployment unit as long as the new deployment unit supports the operations depended upon by other deployment units. Thus, while deployment units can depend on the external interfaces of process components in other deployment units, deployment units are not dependent on process component interactions (i.e., interactions between process components involving their respective business objects, operations, interfaces, and messages) within other deployment units. Similarly, process components that interact with other process components or external systems only through messages, e.g., as sent and received by operations, can also be replaced as long as the replacement supports the operations of the original.

Interactions between process components that occur only within a deployment unit are not constrained to using service operations. These can be implemented in any convenient fashion.

In contrast to a deployment unit, the foundation layer does not define a limit for application-defined transactions. Deployment units communicate directly with entities in the foundation layer, which communication is typically not message based. The foundation layer is active in every system instance on which the application is deployed. Business objects in the foundation layer will generally be master data objects. In addition, the foundation layer will include some business process objects that are used by multiple deployment units. Master data objects and business process objects that should be specific to a deployment unit are preferably assigned to their respective deployment unit.

FIGS. 1A and 1B collectively illustrate a high-level view of a software architectural design and implementation of a suite of enterprise software services having supplier relationship management functionality.

As shown in FIG. 1A, a Purchasing deployment unit 102 includes: a Purchase Order Processing process component 104 that includes a Purchase Order business object 106 and a Purchase Order Confirmation business object 108, a Purchase Request Processing process component 110 that includes a Purchase Request business object 112, a Purchasing Contract Processing process component 114 that includes a Purchasing Contract business object 116, and a Goods and Service Acknowledgement process component 118 that includes a Goods and Service Acknowledgement business object 120.

As shown in FIG. 1B, a Supplier Invoicing deployment unit 122 includes: a Supplier Invoice Processing process component 124, a Supplier Invoice Request business object 126, an Evaluated Receipt Settlement Run business object 127, a Supplier Invoice business object 128, and a Supplier Invoice Verification Exception business object 129.

Additionally, an RFQ Processing deployment unit 130 includes: an RFQ Processing process component 132, a Request for Quote business object 134, and a Supplier Quote business object 136.

Additionally, a Requisitioning deployment unit 138 includes: an Internal Request Processing process component 140 and an Internal Request business object 142.

Figure 2A:
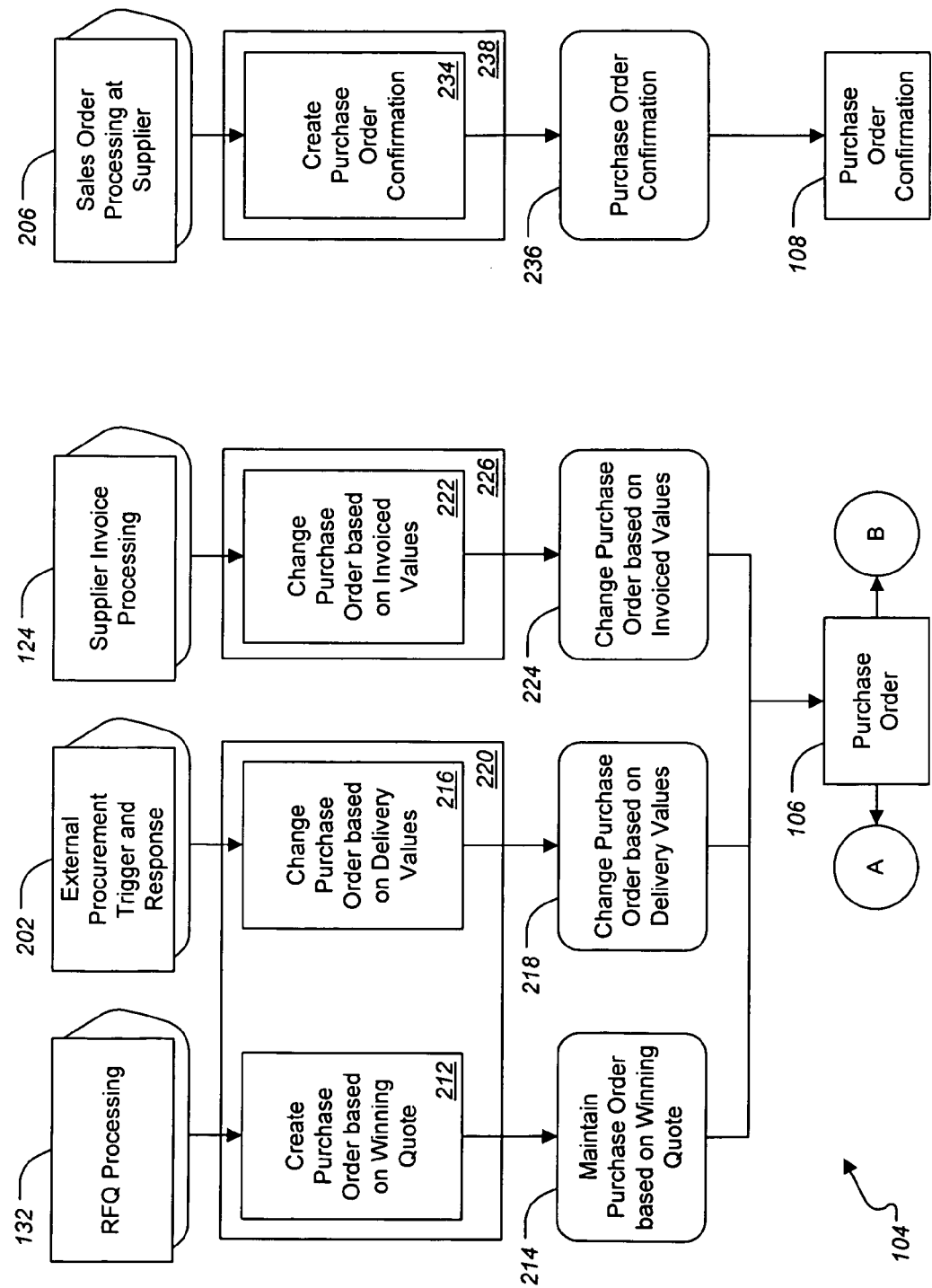
FIGS. 2A, 2B and 2C are block diagrams collectively showing a purchase order processing process component.
Figure 2B:
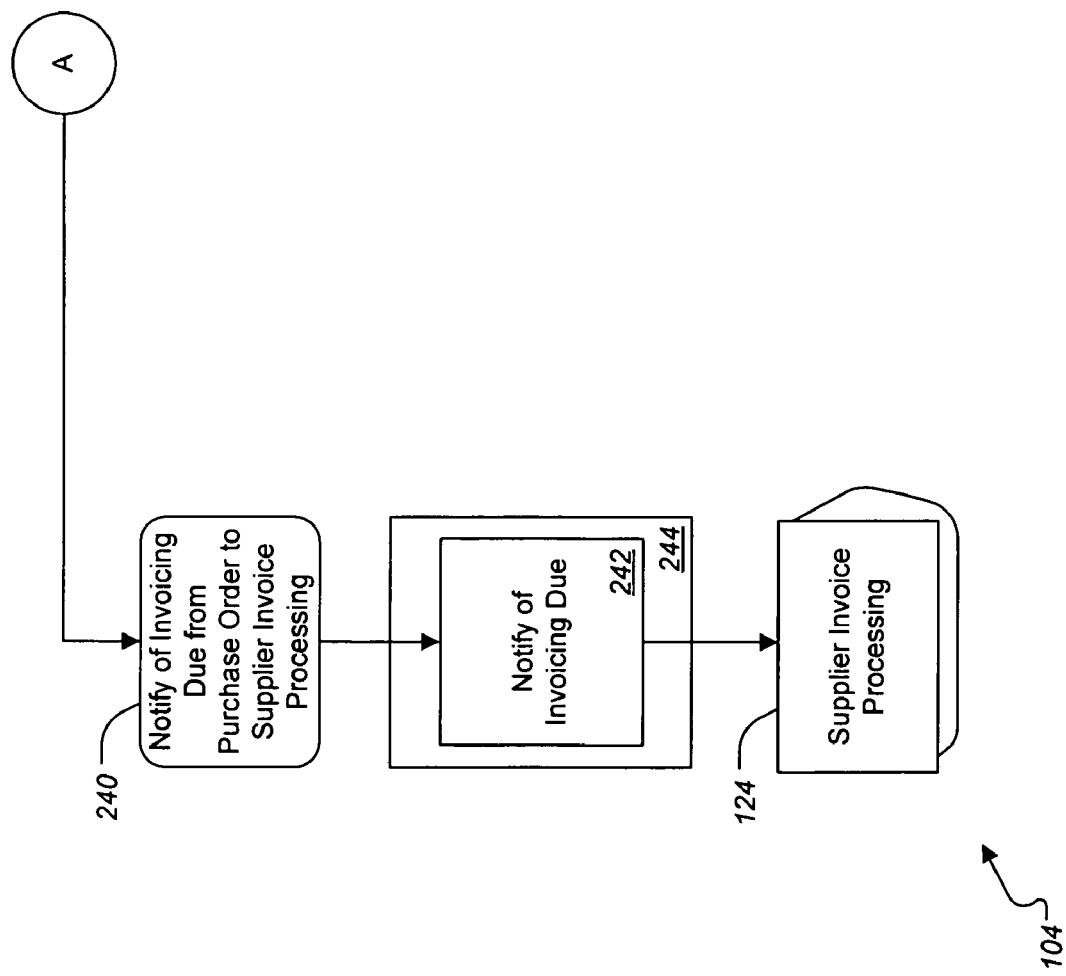
Figure 2C:
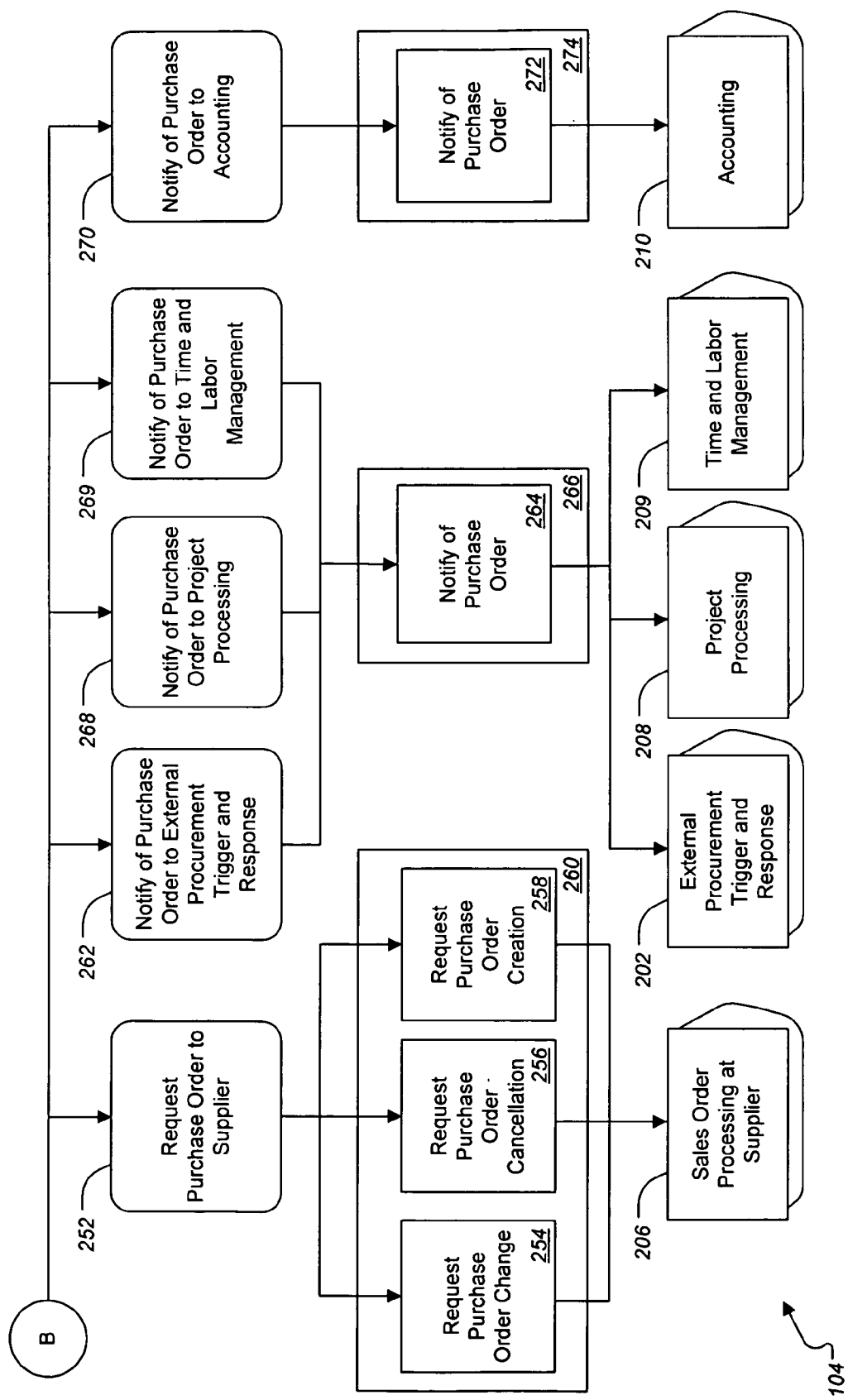

FIGS. 2A, 2B and 2C are block diagrams collectively showing the Purchase Order Processing process component 104 (FIG. 1A). For convenience in describing this process component, a number of other process components are shown in the figures; these other process components are not part of the process component being described. These other process components are the RFQ Processing process component 132, an External Procurement Trigger and Response process component 202, the Supplier Invoice Processing process component 124, a Sales Order Processing at Supplier process component 206, a Project Processing process component 208, and an Accounting process component 210. These other process components are used to represent software external to the process component in describing its interactions with the external software; however, while the external software can be implemented as such process components, this is not required.

A Create Purchase Order based on Winning Quote operation 212 sends a purchase order request using a Maintain Purchase Order based on Winning Quote asynchronous inbound process agent 214 to update the Purchase Order business object 106. For example, the operation 212 can send a purchase order request to update the Purchase Order business object 106 if input is received from the RFQ Processing process component 132.

A Change Purchase Order based on Delivery Values operation 216 sends a purchase order change request using a Change Purchase Order based on Delivery Values asynchronous inbound process agent 218 to update the Purchase Order business object 106. For example, the operation 216 can send a purchase order change request to update the Purchase Order business object 106 if input is received from the External Procurement Trigger and Response process component 202.

The Create Purchase Order based on Winning Quote operation 212 and the Change Purchase Order based on Delivery Values operation 216 are included in a Purchasing In interface 220.

A Change Purchase Order based on Invoiced Values operation 222 sends a purchase order change request using a Change Purchase Order based on Invoiced Values asynchronous inbound process agent 224 to update the Purchase Order business object 106. For example, the operation 222 can send a purchase order change request to update the Purchase Order business object 106 if input is received from the Supplier Invoice Processing process component 124. The Change Purchase Order based on Invoiced Values operation 222 is included in an Invoice Verification In interface 226.

A Create Purchase Order Confirmation operation 234 sends a purchase order confirmation using a Purchase Order Confirmation asynchronous inbound process agent 236 to update the Purchase Order Confirmation business object 108. For example, the operation 234 can send a purchase order confirmation to update the Purchase Order Confirmation business object 108 if input is received from the Sales Order Processing at Supplier process component 206. The Create Purchase Order Confirmation operation 234 is included in an Ordering In interface 238.

The Purchase Order business object 106 can receive updated information and send the update into other components to perform further operations. As shown in FIGS. 2B and 2C, multiple outbound process agents can receive information from the Purchase Order business object 106.

A Notify of Invoicing Due from Purchase Order to Supplier Invoice Processing asynchronous outbound process agent 240 can invoke a Notify of Invoicing Due operation 242. For example, the outbound process agent 240 can send a notification that an invoice is due to a specific supplier. The notification can be sent to the Supplier Invoice Processing process component 124. The Notify of Invoicing Due operation 242 is included in an Invoice Verification Out interface 244.

A Request Purchase Order to Supplier asynchronous outbound process agent 252 can invoke a Request Purchase Order Change operation 254. For example, the outbound process agent 252 can send a request to change an existing purchase order. The notification can be sent to the Sales Order Processing at Supplier process component 206. The Request Purchase Order to Supplier asynchronous outbound process agent 252 can also invoke a Request Purchase Order Cancellation operation 256. For example, the outbound process agent 252 can send a request to cancel an existing purchase order. The notification can be sent to the Sales Order Processing at Supplier process component 206. The Request Purchase Order to Supplier asynchronous outbound process agent 252 can also invoke a Request Purchase Order Creation operation 258. For example, the outbound process agent 252 can send a request to create a new purchase order. The notification can be sent to the Sales Order Processing at Supplier process component 206. The Request Purchase Order Change operation 254, the Request Purchase Order Cancellation operation 256, and the Request Purchase Order Creation operation 258 are included in an Ordering Out interface 260.

A Notify of Purchase Order to External Procurement Trigger and Response asynchronous outbound process agent 262 can invoke a Notify of Purchase Order operation 264. For example, the outbound process agent 262 can send a notification of the purchase order to the External Procurement Trigger and Response process component 202. The Notify of Purchase Order operation 264 is included in a Purchasing Out interface 266.

A Notify of Purchase Order to Project Processing asynchronous outbound process 5 agent 268 can also invoke the Notify of Purchase Order operation 264. For example, the outbound process agent 268 can send a notification of the purchase order to the Project Processing process component 208.

A Notify of Purchase Order to Time and Labor Management asynchronous outbound process agent 269 can also invoke the Notify of Purchase Order operation 264. For example, 10 the outbound process agent 269 can send a notification of the purchase order to the Time and Labor Management process component 209.

A Notify of Purchase Order to Accounting asynchronous outbound process agent 270 can invoke a Notify of Purchase Order operation 272. For example, the outbound process agent 270 can send a notification of the purchase order to the Accounting process component 210. The Notify of Purchase Order operation 272 is included in an Order Accounting Out interface 274.

Figure 3A:
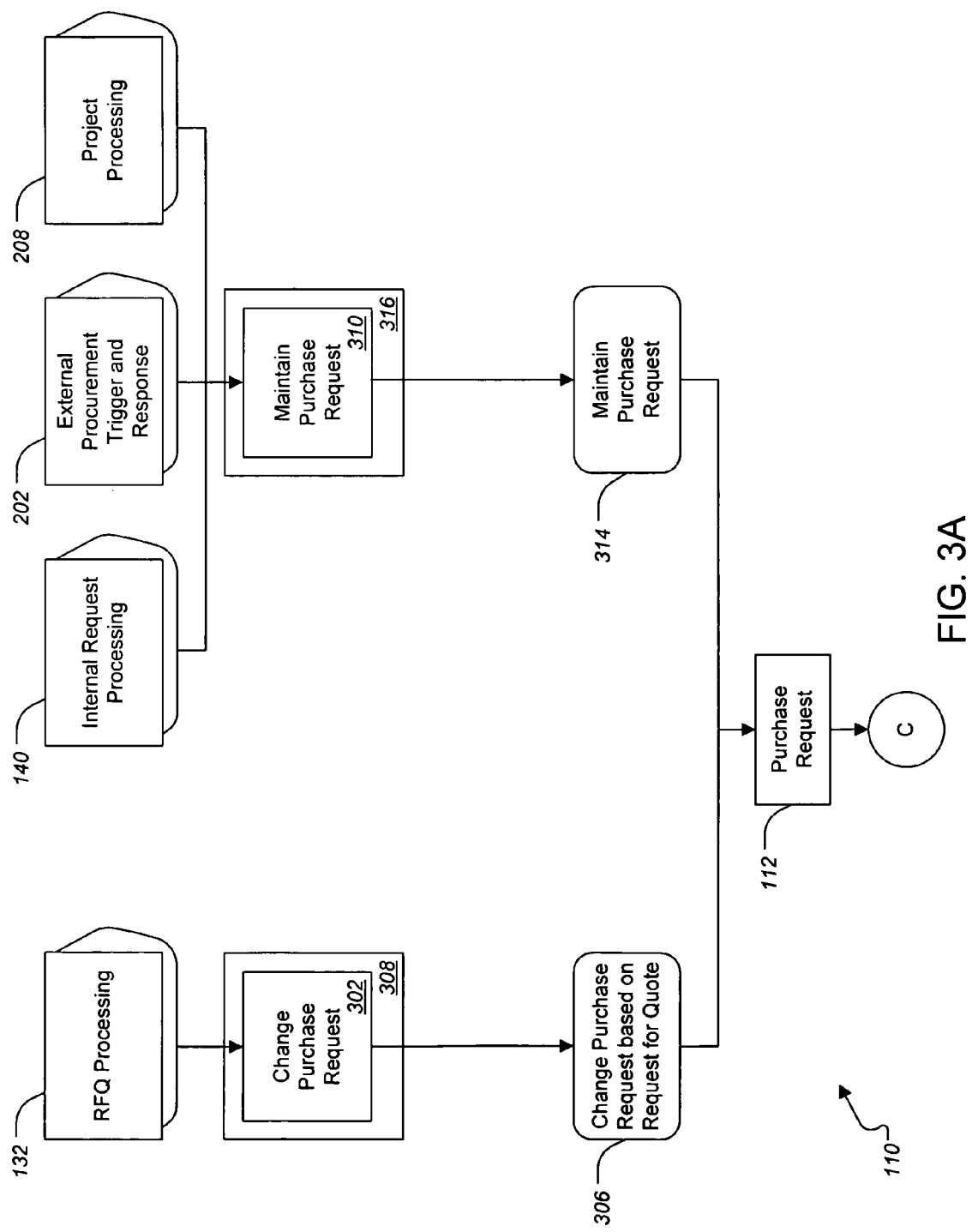
FIGS. 3A and 3B are block diagrams collectively showing a purchase request processing process component.
Figure 3B:
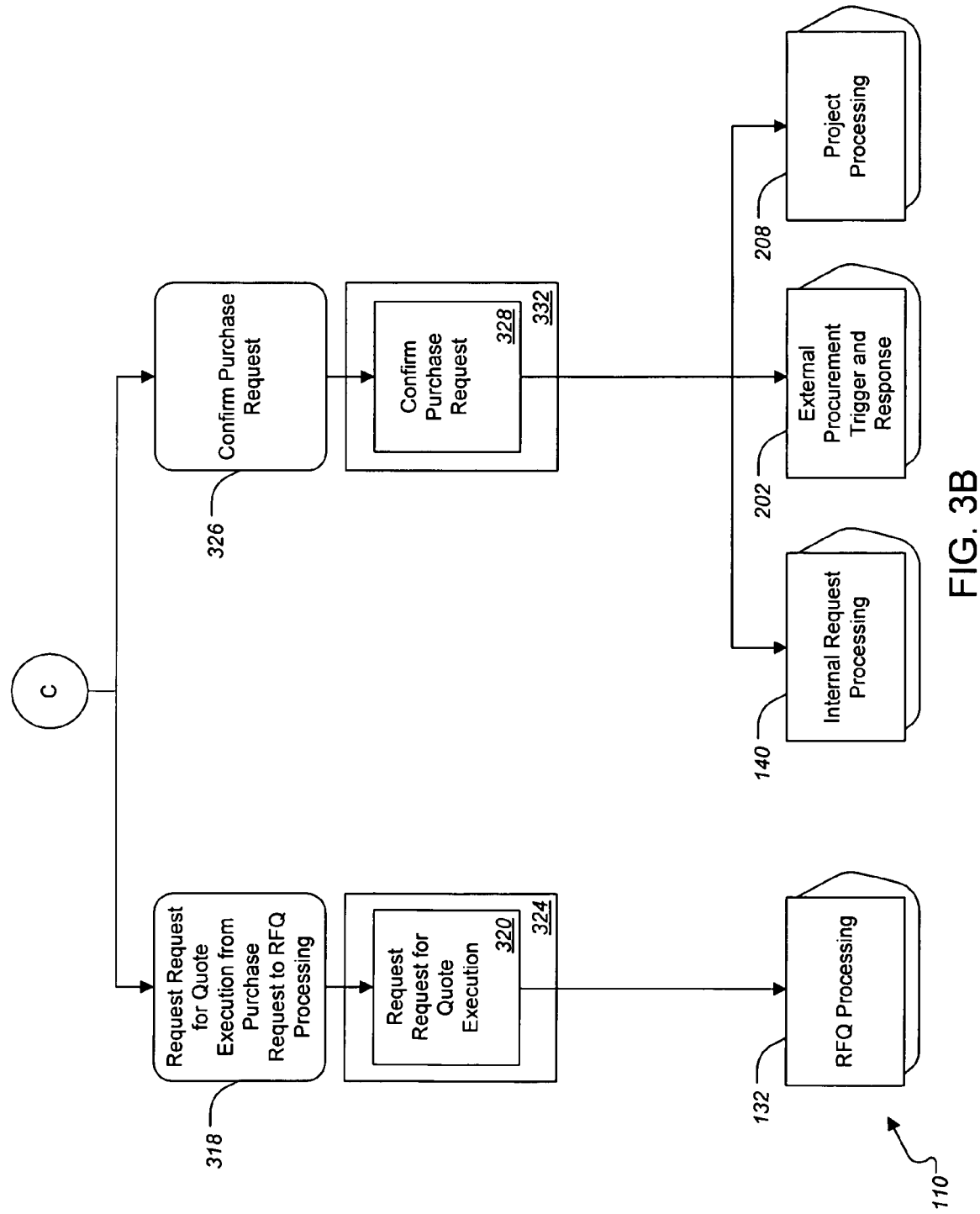

FIGS. 3A and 3B are block diagrams collectively showing the Purchase Request Processing process component 110 (FIG. 1A). For convenience in describing this process component, a number of other process components are shown in the figures; these other process components are not part of the process component being described. These other process components are the RFQ Processing process component 132, the Internal Request Processing process component 140, the External Procurement Trigger and Response process component 202, and the Project Processing process component 208. These other process components are used to represent software external to the process component in describing its interactions with the external software; however, while the external software can be implemented as such process components, this is not required.

A Change Purchase Request operation 302 can send a request to a Change Purchase Request based on Request for Quote asynchronous inbound process agent 306 to update the Purchase Request business object 112. For example, the operation 302 can send a request to update the Purchase Request business object 112 if input is received from the RFQ Processing process component 132. The Change Purchase Request operation 302 is included in a Request for Quote In interface 308.

A Maintain Purchase Request operation 310 can send a request to a Maintain Purchase Request asynchronous inbound process agent 314 to update the Purchase Request business object 112. For example, the operation 310 can send the request to update the Purchase Request business object 112 if input is received from the Internal Request Processing process component 140, the External Procurement Trigger and Response process component 202, or the Project Processing process component 208. The Maintain Purchase Request operation 310 is included in a Purchasing In interface 316.

The Purchase Request business object 112 can receive updated information and send the update into other components to perform further operations. As shown in FIG. 3B, multiple outbound process agents can receive information from the Purchase Request business object 112.

A Request Request for Quote Execution from Purchase Request to RFQ Processing asynchronous outbound process agent 318 can invoke a Request Request for Quote Execution operation 320. For example, the outbound process agent 318 can invoke the operation 320 to update the RFQ Processing process component 132. The Request Request for Quote Execution operation 320 is included in a Request for Quote Out interface 324.

A Confirm Purchase Request asynchronous outbound process agent 326 can invoke a Confirm Purchase Request operation 328. For example, the outbound process agent 326 can invoke the operation 328 to update the Internal Request Processing process component 140, the External Procurement Trigger and Response process component 202, or the Project Processing process component 208. The Confirm Purchase Request operation 328 is included in a Purchasing Out interface 332.

Figure 4A:
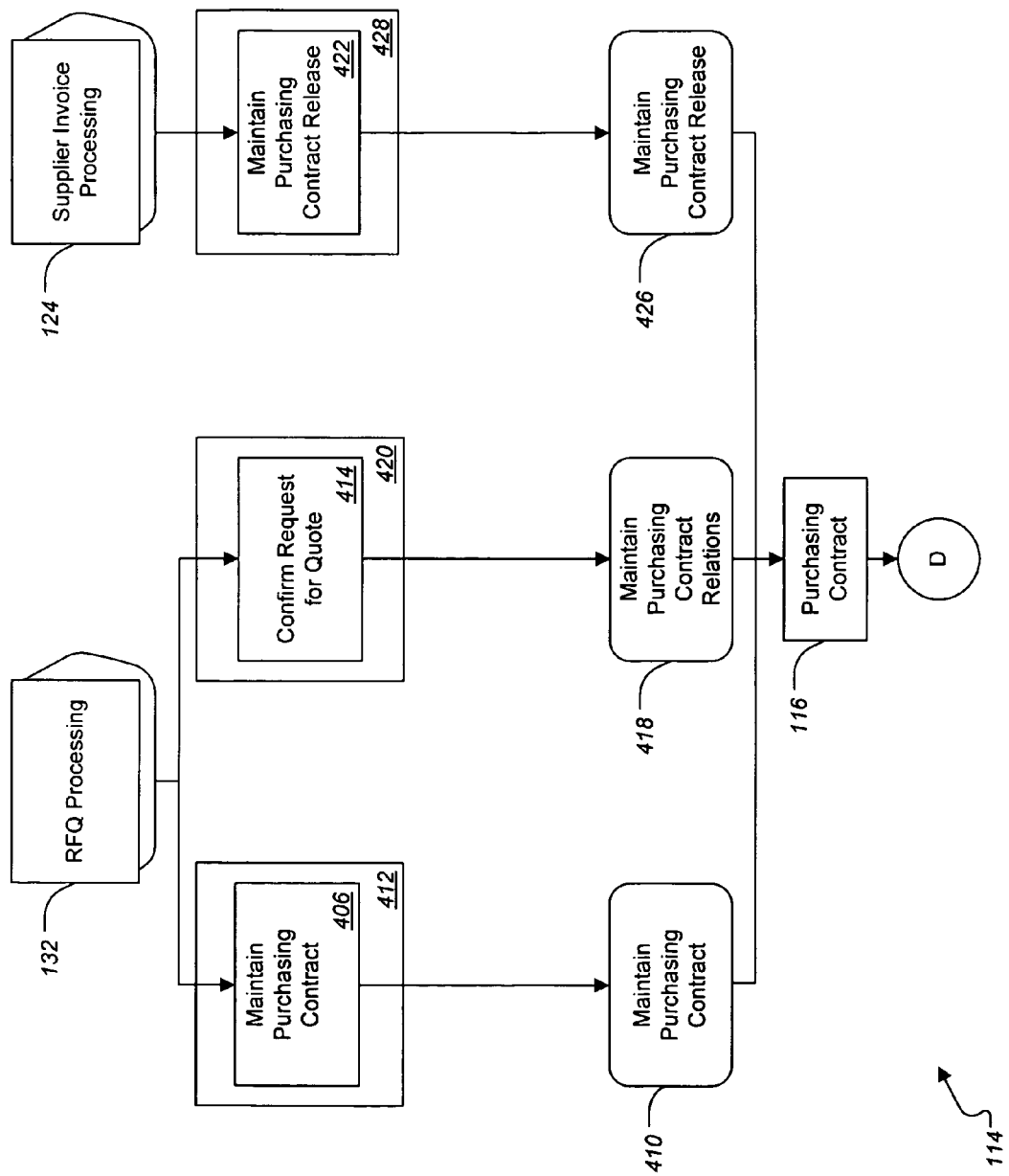
FIGS. 4A and 4B are block diagrams collectively showing a purchasing contract processing process component.
Figure 4B:
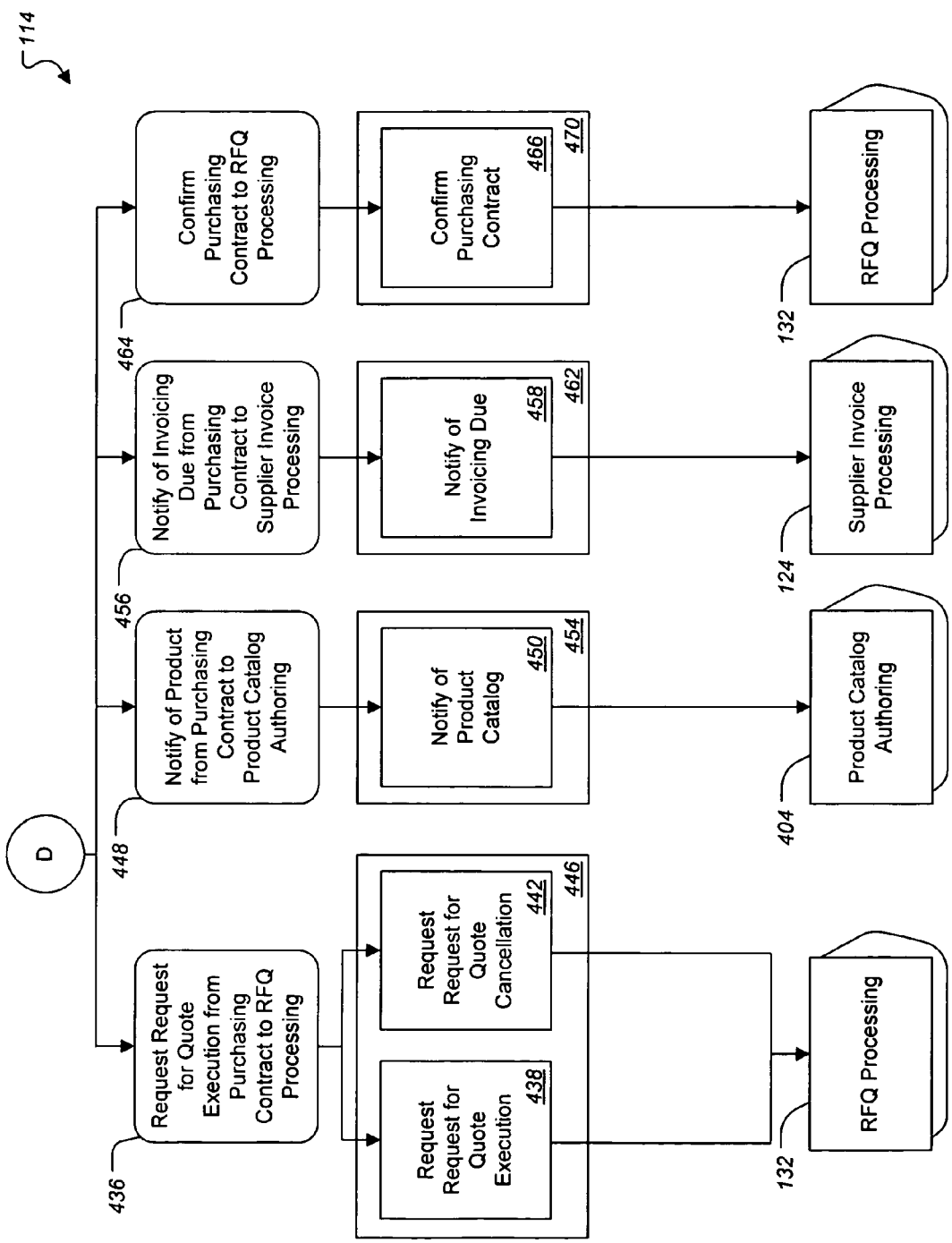

FIGS. 4A and 4B are block diagrams collectively showing the Purchasing Contract Processing process component 114 (FIG. 1A). For convenience in describing this process component, a number of other process components are shown in the figures; these other process components are not part of the process component being described. These other process components are the RFQ Processing process component 132, the Supplier Invoice Processing process component 124, and a Product Catalog Authoring process component 404 These other process components are used to represent software external to the process component in describing its interactions with the external software; however, while the external software can be implemented as such process components, this is not required.

A Maintain Purchasing Contract operation 406 can send a message to a Maintain Purchasing Contract asynchronous inbound process agent 410 to update the Purchasing Contract business object 116. For example, the operation 406 can send a message to update the Purchasing Contract business object 116 if input is received from the RFQ Processing process component 132. The Maintain Purchasing Contract operation 406 is included in a Contract Maintenance In interface 412.

A Confirm Request for Quote operation 414 can send a message to a Maintain Purchasing Contract Relations asynchronous inbound process agent 418 to update the Purchasing Contract business object 116. For example, the operation 414 can send a message to update the Purchasing Contract business object 116 if input is received from the RFQ Processing process component 132. The Confirm Request for Quote operation 414 is included in a Request for Quote In interface 420.

A Maintain Purchasing Contract Release operation 422 can send a message to a Maintain Purchasing Contract Release asynchronous inbound process agent 426 to update the Purchasing Contract business object 116. For example, the operation 422 can send a message to update the Purchasing Contract business object 116 if input is received from the Supplier Invoice Processing process component 124. The Maintain Purchasing Contract Release operation 422 is included in a Contract Release In interface 428.

The Purchasing Contract business object 116 can receive updated information and send the update into other components to perform further operations. As shown in FIG. 4B, multiple outbound process agents can receive information from the Purchasing Contract business object 116.

A Request Request for Quote Execution from Purchasing Contract to RFQ Processing asynchronous outbound process agent 436 can invoke a Request Request for Quote Execution operation 438. For example, the outbound process agent 436 can invoke the operation 438 to send a message to the RFQ Processing process component 132. The outbound process agent 436 can also invoke a Request Request for Quote Cancellation operation 442. For example, the outbound process agent 436 can invoke the operation 442 to send a message to the RFQ Processing process component 132. The Request Request for Quote Execution operation 438 and the Request Request for Quote Cancellation operation 442 are included in a Request for Quote Out interface 446.

A Notify of Product from Purchasing Contract to Product Catalog Authoring asynchronous outbound process agent 448 can invoke a Notify of Product Catalog operation 450. For example, the outbound process agent 448 can invoke the operation 450 to send a message to the Product Catalog Authoring process component 404. The Notify of Product Catalog operation 450 is included in a Product Catalog Authoring Out interface 454.

A Notify of Invoicing Due from Purchasing Contract to Supplier Invoice Processing asynchronous outbound process agent 456 can invoke a Notify of Invoicing Due operation 458. For example, the outbound process agent 456 can invoke the operation 458 to send a message to the Supplier Invoice Processing process component 124. The Notify of Invoicing Due operation 458 is included in an Invoice Verification Out interface 462.

A Confirm Purchasing Contract to RFQ Processing asynchronous outbound process agent 464 can invoke a Confirm Purchasing Contract operation 466. For example, the outbound process agent 464 can invoke the operation 466 to send a message to the RFQ Processing process component 132. The Confirm Purchasing Contract operation 466 is included in a Purchasing Contract Out interface 470.

Figure 5A:
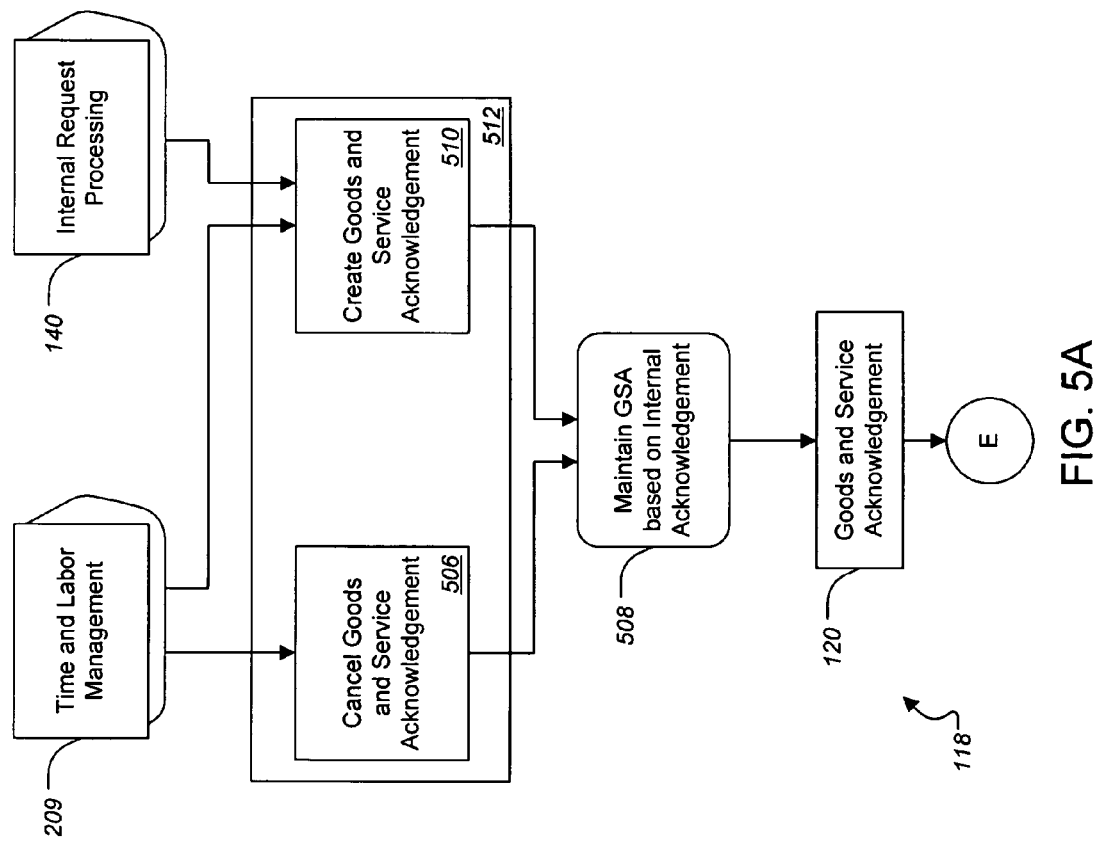
FIGS. 5A and 5B are block diagrams collectively showing a goods and service acknowledgement process component.
Figure 5B:
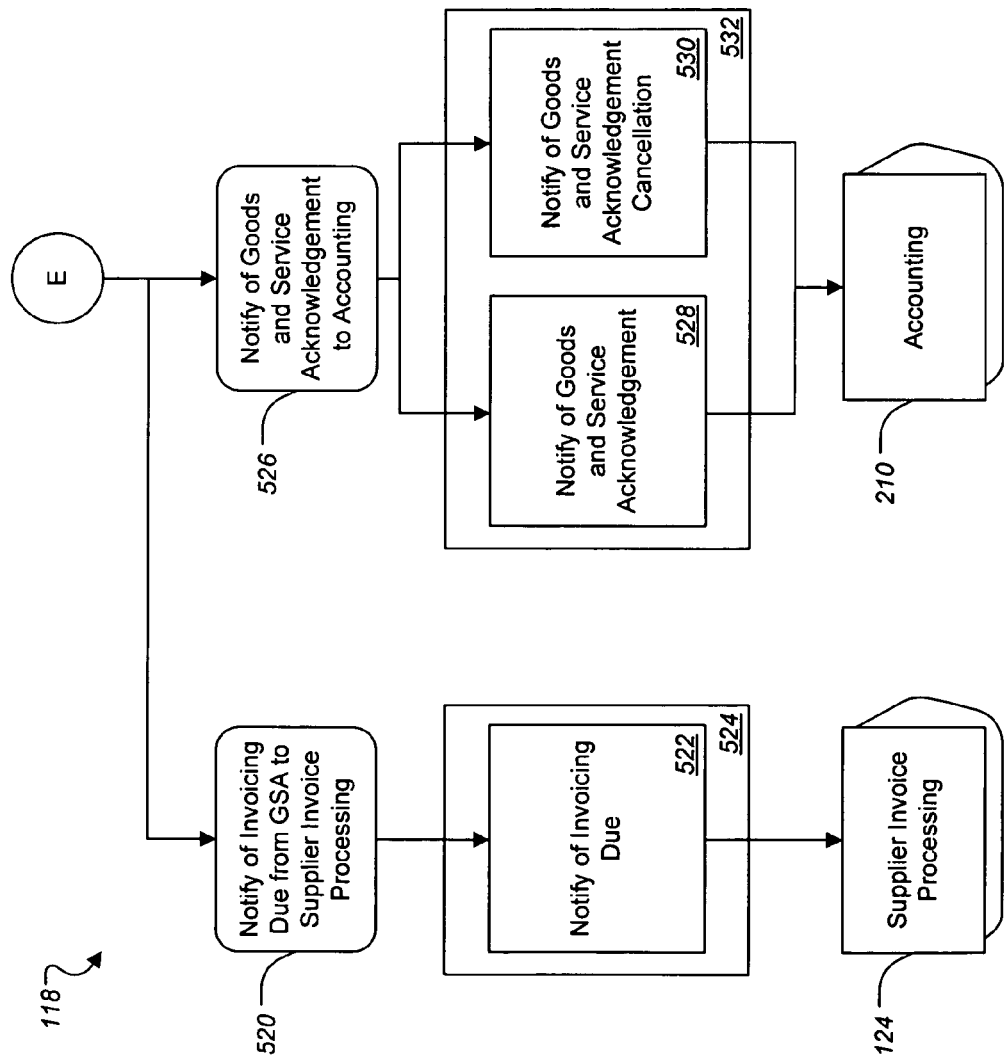

FIGS. 5A and 5B are block diagrams collectively showing the Goods and Service Acknowledgement process component 118 (FIG. 1A). For convenience in describing this process component, a number of other process components are shown in the figures; these other process components are not part of the process component being described. These other process components are the Time and Labor Management process component 209, the Internal Request Processing process component 140, the Supplier Invoice Processing process component 124, and the Accounting process component 210. These other process components are used to represent software external to the process component in describing its interactions with the external software; however, while the external software can be implemented as such process components, this is not required.

A Cancel Goods and Service Acknowledgement operation 506 can send an acknowledgement using a Maintain Goods and Service Acknowledgement (GSA) based on Internal Acknowledgement asynchronous inbound process agent 508 to update the Goods and Service Acknowledgement business object 120. For example, the operation 506 can send an acknowledgement to update the Goods and Service Acknowledgement business object 120 if input is received from the Time and Labor Management process component 209. A Create Goods and Service Acknowledgement operation 510 can also send an acknowledgement using the Maintain GSA based on Internal Acknowledgement asynchronous inbound process agent 508 to update the Goods and Service Acknowledgement business object 120. For example, the operation 506 can send an acknowledgement to update the Goods and Service Acknowledgement business object 120 if input is received from the Time and Labor Management process component 209 or the Internal Request Processing process component 140. The Cancel Goods and Service Acknowledgement operation 506 and the Create Goods and Service Acknowledgement operation 510 are included in an Internal Acknowledgement In interface 512.

The Goods and Service Acknowledgement business object 120 can receive updated information and send the update into other components to perform further operations. As shown in FIG. 5B, multiple outbound process agents can receive information from the Goods and Service Acknowledgement business object 120.

A Notify of Invoicing Due from GSA to Supplier Invoice Processing asynchronous outbound process agent 520 can invoke a Notify of Invoicing Due operation 522. For example, the outbound process agent 520 can send a notification of an invoice due for items in a purchase order. The notification can be sent to the Supplier Invoice Processing process component 124. The Notify of Invoicing Due operation 522 is included in an Invoice Verification Out interface 524.

A Notify of Goods and Service Acknowledgement to Accounting asynchronous outbound process agent 526 can invoke a Notify of Goods and Service Acknowledgement operation 528. For example, the outbound process agent 526 can send a notification that goods or services were received. The notification can be sent to the Accounting process component 210. The Notify of Goods and Service Acknowledgement to Accounting asynchronous outbound process agent 526 can also invoke a Notify of Goods and Service Acknowledgement Cancellation operation 530. For example, the outbound process agent can cancel a notification that goods or services were received. The notification can be sent to the Accounting process component 210. The Notify of Goods and Service Acknowledgement operation 528 and the Notify of Goods and Service Acknowledgement Cancellation operation 530 are included in a Goods and Service Accounting Out interface 532.

Figure 6A:
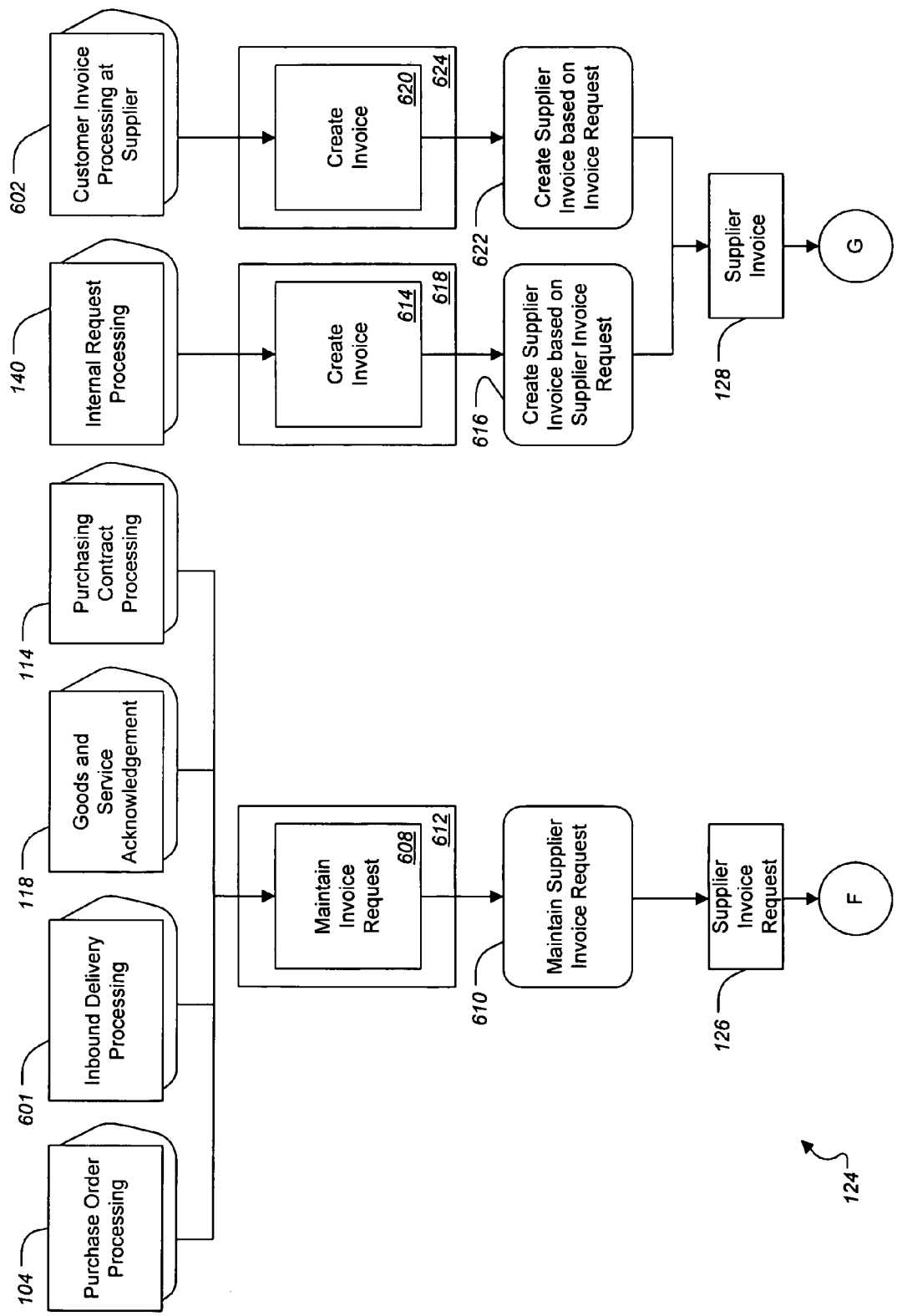
FIGS. 6A, 6B and 6C are block diagrams collectively showing a supplier invoice processing process component.
Figure 6B:
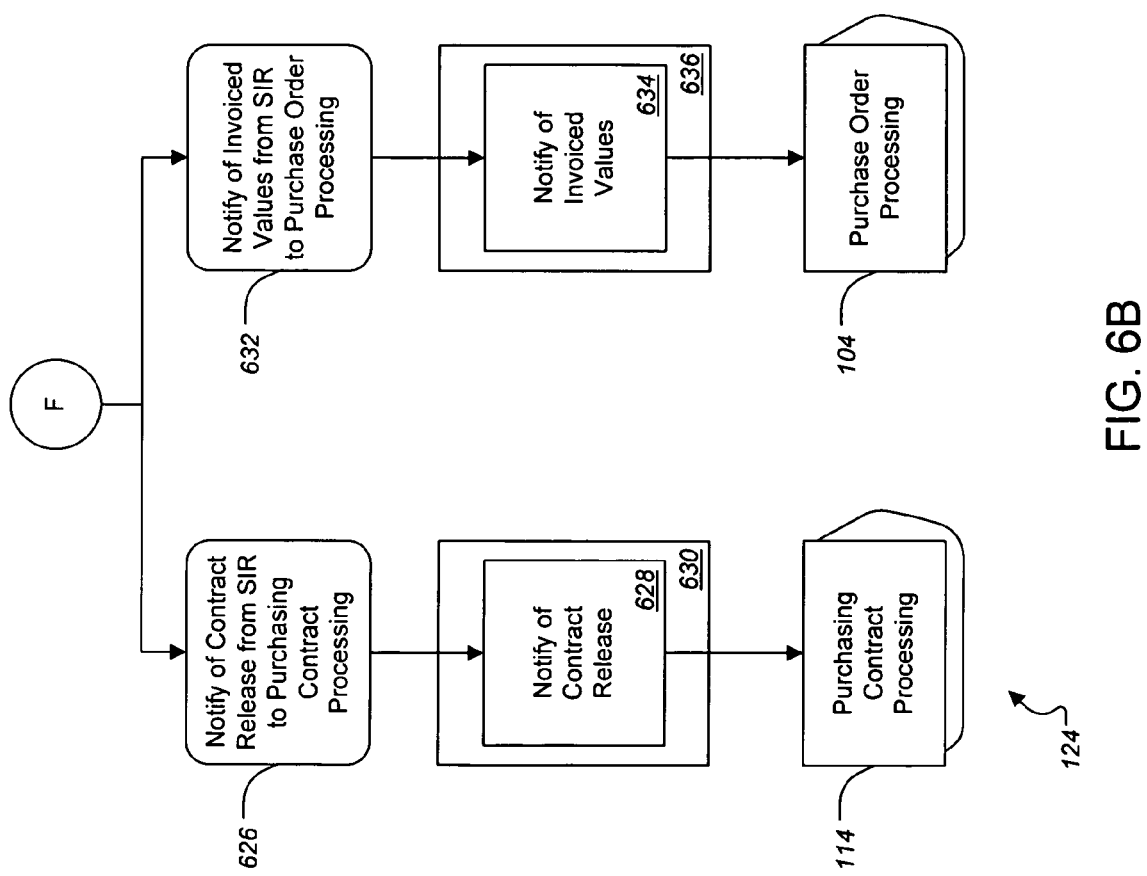
Figure 6C:
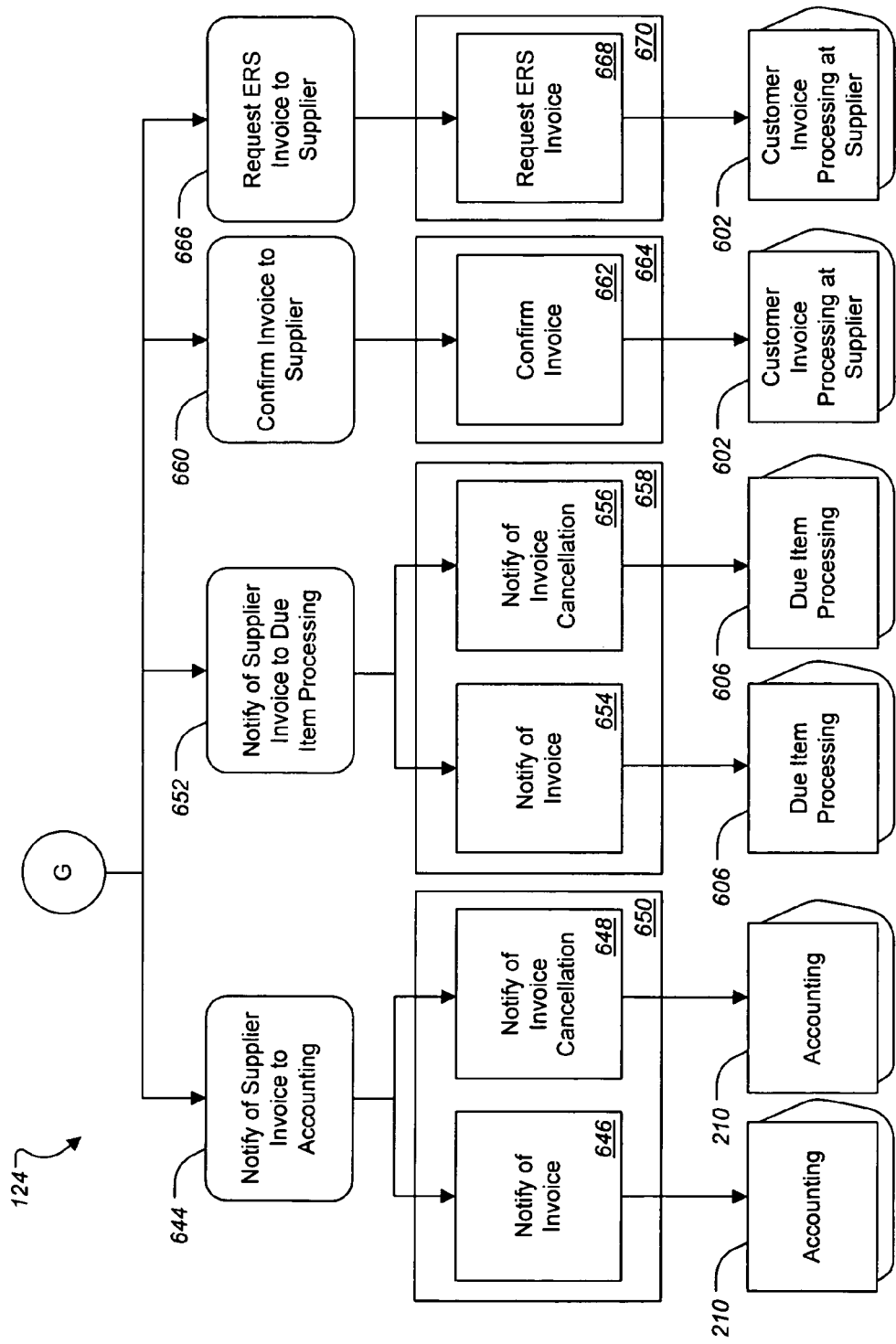

FIGS. 6A, 6B and 6C are block diagrams collectively showing the Supplier Invoice Processing process component 124 (FIG. 1B). For convenience in describing this process component, a number of other process components are shown in the figures; these other process components are not part of the process component being described. These other process components are the Purchase Order Processing process component 104, an Inbound Delivery Processing process component 601, the Goods and Service Acknowledgement process component 118, the Purchasing Contract Processing process component 114, the Internal Request Processing process component 140, a Customer Invoice Processing at Supplier process component 602, the Accounting process component 210, and a Due Item Processing process component 606. These other process components are used to represent software external to the process component in describing its interactions with the external software; however, while the external software can be implemented as such process components, this is not required.

A Maintain Invoice Request operation 608 can send a request using a Maintain Supplier Invoice Request asynchronous inbound process agent 610 to update the Supplier Invoice Request business object 126. For example, the operation 608 can send a request to update the Supplier Invoice Request business object 126 if input is received from the Purchase Order Processing process component 104, the Inbound Delivery Processing process component 601, the Goods and Service Acknowledgement process component 118, or the Purchasing Contract Processing process component 114. The Maintain Invoice Request operation 608 is included in an Invoice Verification In interface 612.

A Create Invoice operation 614 can send a request using a Create Supplier Invoice based on Supplier Invoice Request asynchronous inbound process agent 616 to update the Supplier Invoice business object 128. For example, the operation 614 can send a supplier invoice request to update the Supplier Invoice business object 128 if input is received from the Internal Request Processing process component 140. The Create Invoice operation 614 is included in an Internal Invoicing In interface 618.

A Create Invoice operation 620 can send a request using a Create Supplier Invoice based on Invoice Request asynchronous inbound process agent 622 to update the Supplier Invoice business object 128. For example, the operation 620 can send a supplier invoice request to update the Supplier Invoice business object 128 if input is received from the Customer Invoice Processing at Supplier process component 602. The Create Invoice operation 620 is included in an Invoicing In interface 624.

The Supplier Invoice Request business object 126 can receive updated information and send the update into other components to perform further operations. As shown in FIG. 6B, multiple outbound process agents can receive information from the Supplier Invoice Request business object 126.

A Notify of Contract Release from Supplier Invoice Request (SIR) to Purchasing Contract Processing asynchronous outbound process agent 626 can invoke a Notify of Contract Release operation 628. For example, the outbound process agent 626 can send a notification of a released contract. The notification can be sent to the Purchasing Contract Processing process component 114. The Notify of Contract Release operation 628 is included in a Contract Release Out interface 630.

A Notify of Invoiced Values from SIR to Purchase Order Processing asynchronous outbound process agent 632 can invoke a Notify of Invoiced Values operation 634. For example, the outbound process agent 632 can send a notification of invoiced values for a purchase order. The notification can be sent to the Purchase Order Processing process component 104. The Notify of Invoiced Values operation 634 is included in an Invoice Verification Out interface 636.

The Supplier Invoice business object 128 can receive updated information and send the update into other components to perform further operations. As shown in FIG. 6C, multiple outbound process agents can receive information from the Supplier Invoice business object 128.

A Notify of Supplier Invoice to Accounting asynchronous outbound process agent 644 can invoke a Notify of Invoice operation 646. For example, the outbound process agent 644 can send a notification of an invoice that was created for a particular supplier. The notification can be sent to the Accounting process component 210. The Notify of Supplier Invoice to Accounting asynchronous outbound process agent 644 can also invoke a Notify of Invoice Cancellation operation 648. For example, the outbound process agent 644 can send a notification of the cancellation of an invoice for a supplier. The notification can be sent to the Accounting process component 210. The Notify of Invoice operation 646 and the Notify of Invoice Cancellation operation 648 are included in an Invoice Accounting Out interface 650.

A Notify of Supplier Invoice to Due Item Processing asynchronous outbound process agent 652 can invoke a Notify of Invoice operation 654. For example, the outbound process agent 652 can send a notification of an invoice that was created for a particular supplier. The notification can be sent to the Due Item Processing process component 606. The Notify of Supplier Invoice to Due Item Processing asynchronous outbound process agent 652 can also invoke a Notify of Invoice Cancellation operation 656. For example, the outbound process agent 652 can send a notification of the cancellation of an invoice for a supplier. The notification can be sent to the Due Item Processing process component 606. The Notify of Invoice operation 654 and the Notify of Invoice Cancellation operation 656 are included in a Receivables Payables Out interface 658.

A Confirm Invoice to Supplier asynchronous outbound process agent 660 can invoke a Confirm Invoice operation 662. For example, the outbound process agent 660 can send a notification to confirm an invoice to a supplier. The notification can be sent to the Customer Invoice Processing at Supplier process component 602. The Confirm Invoice operation 662 is included in an Invoicing Out interface 664.

A Request Evaluated Receipt Settlement (ERS) Invoice to Supplier asynchronous outbound process agent 666 can invoke a Request ERS Invoice operation 668. For example, the outbound process agent 666 can send a notification of an ERS invoice. The notification can be sent to the Customer Invoice Processing at Supplier process component 602. The Request ERS Invoice operation 668 is included in an ERS Invoicing Out interface 670.

Figure 7A:
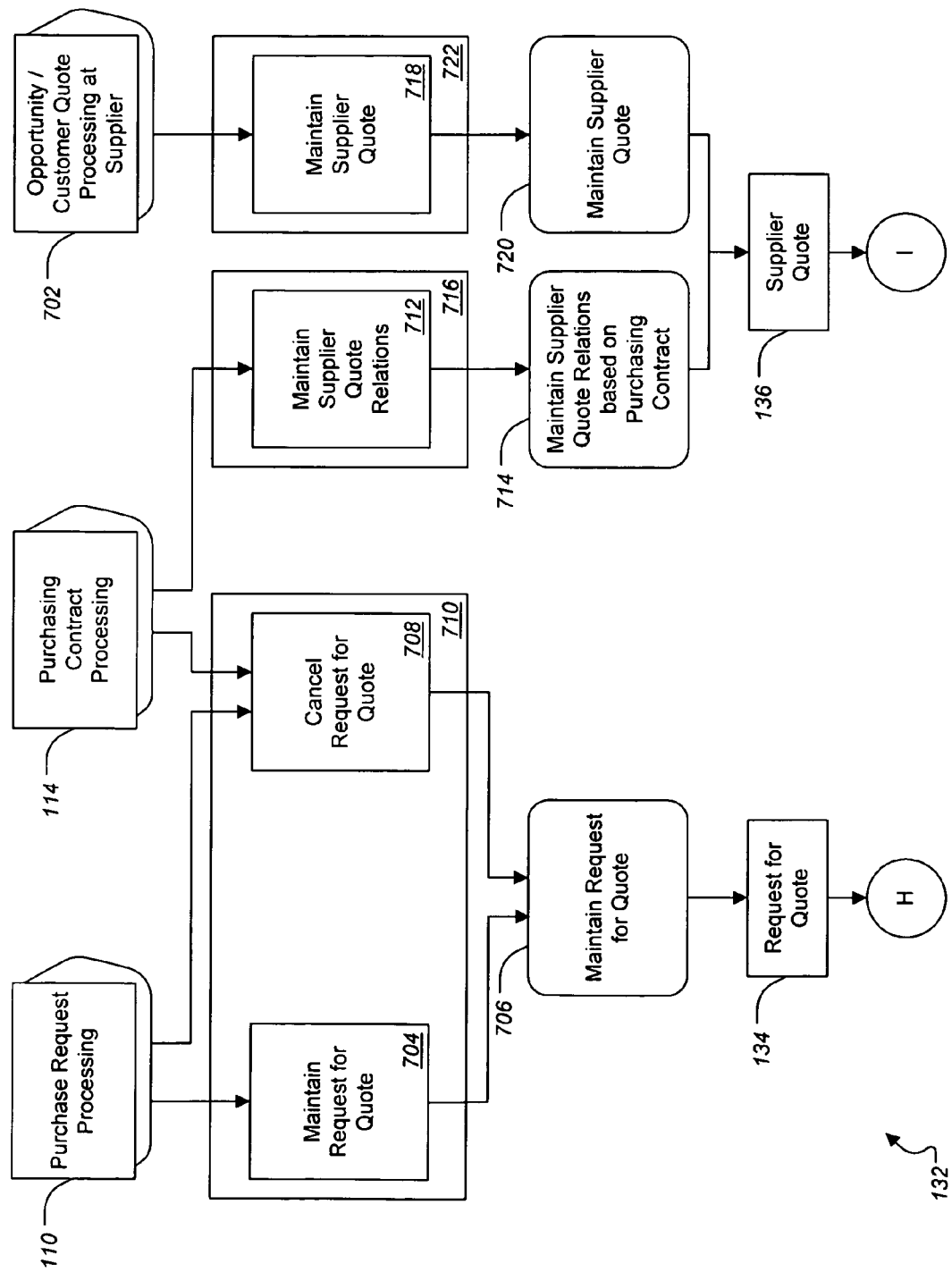
FIGS. 7A, 7B and 7C are block diagrams collectively showing a request for quote (RFQ) processing process component.
Figure 7B:
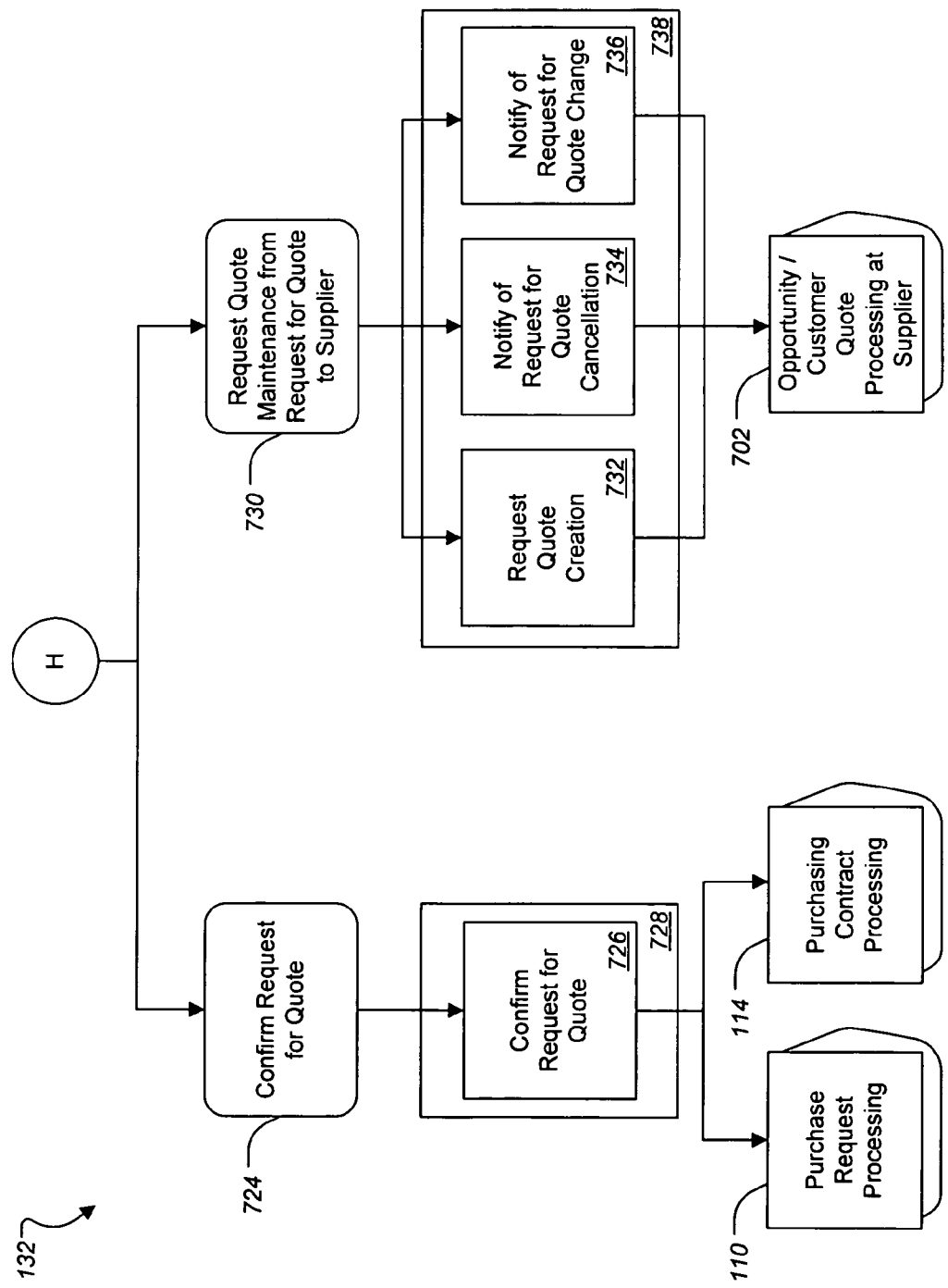
Figure 7C:
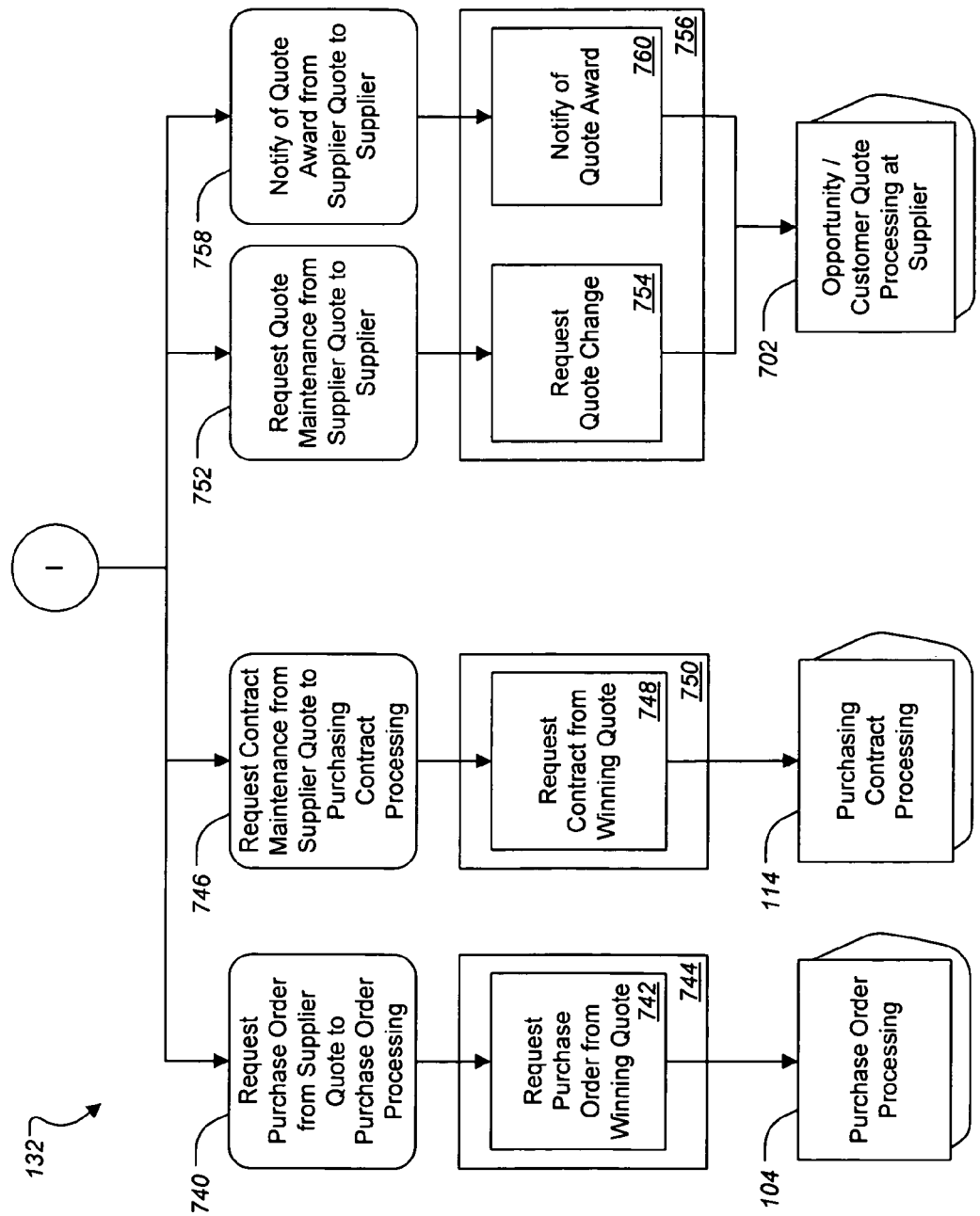

FIGS. 7A, 7B and 7C are block diagrams collectively showing the RFQ Processing process component 132 (FIG. 1B). For convenience in describing this process component, a number of other process components are shown in the figures; these other process components are not part of the process component being described. These other process components are the Purchase Request Processing process component 110, the Purchasing Contract Processing process component 114, an Opportunity/Customer Quote Processing at Supplier process component 702, and the Purchase Order Processing process component 104. These other process components are used to represent software external to the process component in describing its interactions with the external software; however, while the external software can be implemented as such process components, this is not required.

A Maintain Request for Quote operation 704 can send a request for quote using a Maintain Request for Quote asynchronous inbound process agent 706 to update the Request for Quote business object 134. For example, the operation 704 can send a request for quote to update the Request for Quote business object 134 if input is received from the Purchase Request Processing process component 110. A Cancel Request for Quote operation 708 can send a cancellation request using the Maintain Request for Quote asynchronous inbound process agent 706 to update the Request for Quote business object 134. For example, the operation 708 can send a cancellation request to update the Request for Quote business object 134 if input is received from the Purchase Request Processing process component 110 or the Purchasing Contract Processing process component 114. The Maintain Request for Quote operation 704 and the Cancel Request for Quote operation 708 are included in a Request for Quote In interface 710.

A Maintain Supplier Quote Relations operation 712 can send a supplier quote using a Maintain Supplier Quote Relations based on Purchasing Contract asynchronous inbound process agent 714 to update the Supplier Quote business object 136. For example, the operation 712 can send a supplier quote to update the Supplier Quote business object 136 if input is received from the Purchasing Contract Processing process component 114. The Maintain Supplier Quote Relations operation 712 is included in a Purchasing Contract In interface 716.

A Maintain Supplier Quote operation 718 can send a supplier quote using a Maintain Supplier Quote asynchronous inbound process agent 720 to update the Supplier Quote business object 136. For example, the operation 718 can send a supplier quote to update the Supplier Quote business object 136 if input is received from the Opportunity/Customer Quote Processing at Supplier process component 702. The Maintain Supplier Quote operation 718 is included in a Supplier Quote Processing In interface 722.

The Request for Quote business object 134 can receive updated information and send the update into other components to perform further operations. As shown in FIG. 7B, multiple outbound process agents can receive information from the Request for Quote business object 134.

A Confirm Request for Quote asynchronous outbound process agent 724 can invoke a Confirm Request for Quote operation 726. For example, the outbound process agent 724 can send a notification to confirm a request for quote. The notification can be sent to the Purchase Request Processing process component 110 or the Purchasing Contract Processing process component 114. The Confirm Request for Quote operation 726 is included in a Request for Quote Out interface 728.

A Request Quote Maintenance from Request for Quote to Supplier asynchronous outbound process agent 730 can invoke a Request Quote Creation operation 732. For example, the outbound process agent 730 can send a notification of a request to create a quote. The notification can be sent to the Opportunity/Customer Quote Processing at Supplier process component 702. The Request Quote Maintenance from Request for Quote to Supplier asynchronous outbound process agent 730 can also invoke a Notify of Request for Quote Cancellation operation 734. For example, the outbound process agent 730 can send a notification of a quote cancellation. The notification can be sent to the Opportunity/Customer Quote Processing at Supplier process component 702. The Request Quote Maintenance from Request for Quote to Supplier asynchronous outbound process agent 730 can also invoke a Notify of Request for Quote Change operation 736. For example, the outbound process agent 730 can send a notification of a quote change. The notification can be sent to the Opportunity/Customer Quote Processing at Supplier process component 702. The Request Quote Creation operation 732, the Notify of Request for Quote Cancellation operation 734, and the Notify of Request for Quote Change operation 736 are included in a Request Quote Processing Out interface 738.

The Supplier Quote business object 136 can receive updated information and send the update into other components to perform further operations. As shown in FIG. 7C, multiple outbound process agents can receive information from the Supplier Quote business object 136.

A Request Purchase Order from Supplier Quote to Purchase Order Processing asynchronous outbound process agent 740 can invoke a Request Purchase Order from Winning Quote operation 742. For example, the outbound process agent 740 can send a notification of purchase order based on a winning quote. The notification can be sent to the Purchase Order Processing process component 104. The Request Purchase Order from Winning Quote operation 742 is included in a Purchasing Out interface 744.

A Request Contract from Supplier Quote to Purchasing Contract Processing asynchronous outbound process agent 746 can invoke a Request Contract from Winning Quote operation 748. For example, the outbound process agent 746 can send a contract maintenance request based on a winning quote associated with the contract. The notification can be sent to the Purchasing Contract Processing process component 114. The Request Contract from Winning Quote operation 748 is included in a Purchasing Contract Out interface 750.

A Request Quote Maintenance from Supplier Quote to Supplier asynchronous outbound process agent 752 can invoke a Request Quote Change operation 754. For example, the outbound process agent 752 can send a notification of a quote change request. The notification can be sent to the Opportunity/Customer Quote Processing at Supplier process component 702. The Request Quote Change operation 754 is included in a Supplier Quote Processing Out interface 756.

A Notify of Quote Award from Supplier Quote to Supplier asynchronous outbound process agent 758 can invoke a Notify of Quote Award operation 760. For example, the outbound process agent 758 can send a notification of the quote award. The notification can be sent to the Opportunity/Customer Quote Processing at Supplier process component 702. The Notify of Quote Award operation 760 is included in the Supplier Quote Processing Out interface 756.

Figure 8A:
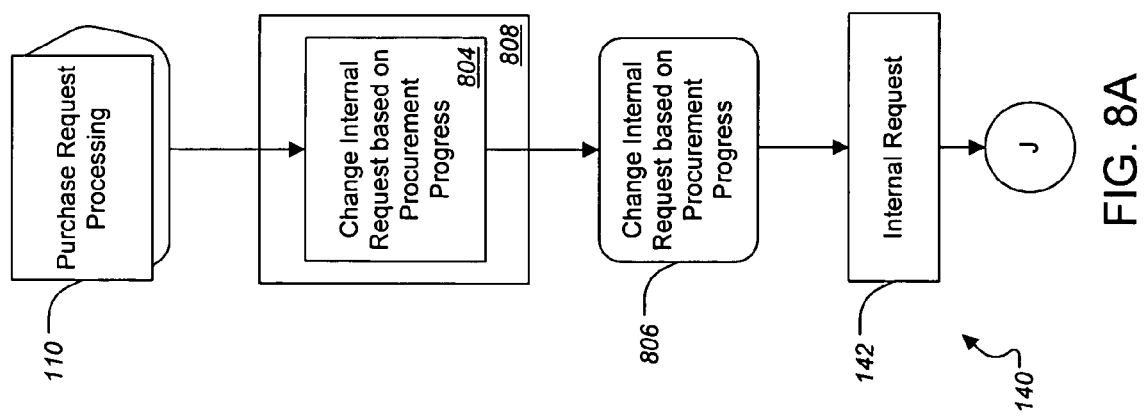
FIGS. 8A and 8B are block diagrams collectively showing an internal request processing process component.
Figure 8B:
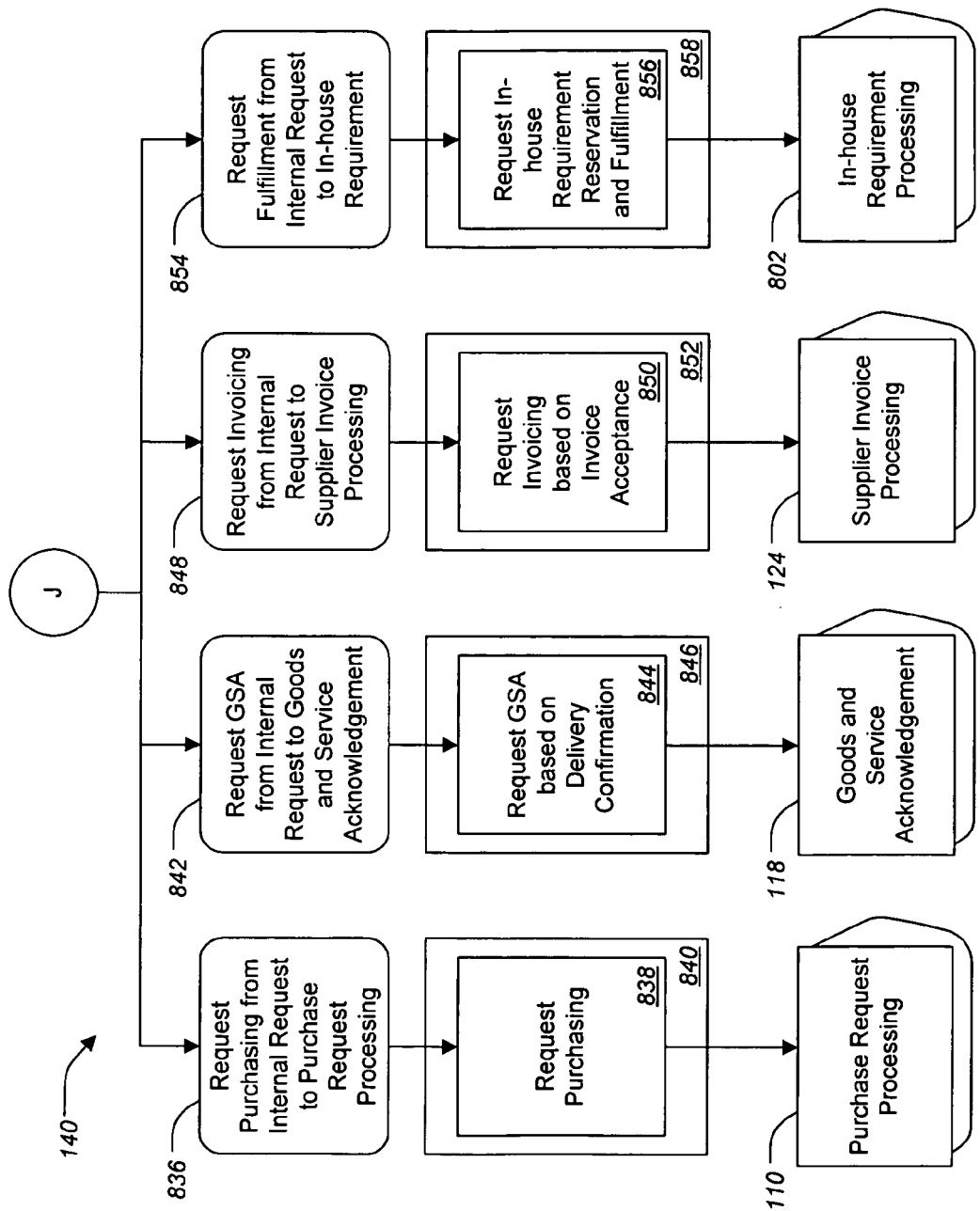

FIGS. 8A and 8B are block diagrams collectively showing the Internal Request Processing process component 140 (FIG. 1B). For convenience in describing this process component, a number of other process components are shown in the figures; these other process components are not part of the process component being described. These other process components are the Purchase Request Processing process component 110, the Goods and Service Acknowledgement process component 118, and the Supplier Invoice Processing process component 124. These other process components are used to represent software external to the process component in describing its interactions with the external software; however, while the external software can be implemented as such process components, this is not required.

A Change Internal Request based on Procurement Progress operation 804 can send a request using a Change Internal Request based on Procurement Progress asynchronous inbound process agent 806 to update the Internal Request business object 142. For example, the operation 804 can send a request to update the Internal Request business object 142 if input is received from the Purchase Request Processing process component 110. The Change Internal Request based on Procurement Progress operation 804 is included in a Purchasing In interface 808.

The Internal Request business object 142 can receive updated information and send the update into other components to perform further operations. As shown in FIG. 8B, multiple outbound process agents can receive information from the Internal Request business object 142.

A Request Purchasing from Internal Request to Purchase Request Processing asynchronous outbound process agent 836 can invoke a Request Purchasing operation 838. For example, the outbound process agent 836 can send a request purchasing notification. The notification can be sent to the Purchase Request Processing process component 110. The Request Purchasing operation 838 is included in a Purchasing Out interface 840.

A Request GSA from Internal Request to Goods and Service Acknowledgement asynchronous outbound process agent 842 can invoke a Request GSA based on Delivery Confirmation operation 844. For example, the outbound process agent 842 can send a notification of a request for a goods and service acknowledgement once the delivery of goods has occurred. The notification can be sent to the Goods and Service Acknowledgement process component 118. The Request GSA based on Delivery Confirmation operation 844 is included in an Internal Acknowledgement Out interface 846.

A Request Invoicing from Internal Request to Supplier Invoice Processing asynchronous outbound process agent 848 can invoke a Request Invoicing based on Invoice Acceptance operation 850. For example, the outbound process agent 848 can send a notification of a request for an invoice after acceptance of the invoice. The notification can be sent to the Supplier Invoice Processing process component 124. The Request Invoicing based on Invoice Acceptance operation 850 is included in an Internal Invoicing Out interface 852.

The subject matter described in this specification and all of the functional operations described in this specification can be implemented in digital electronic circuitry, or in computer software, firmware, or hardware, including the structural means disclosed in this specification and structural equivalents thereof, or in combinations of them. The subject matter described in this specification can be implemented as one or more computer program products, i.e., one or more computer programs tangibly embodied in an information carrier, e.g., in a machine-readable storage device or in a propagated signal, for execution by, or to control the operation of, data processing apparatus, e.g., a programmable processor, a computer, or multiple computers. A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, subprograms, or portions of code). A computer program can be deployed to be executed on one computer or on multiple computers at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The subject matter described in this specification can be implemented in a computing system that includes a back-end component (e.g., a data server), a middleware component (e.g., an application server), or a front-end component (e.g., a client computer having a graphical user interface or a Web browser through which a user can interact with an implementation of the subject matter described herein), or any combination of such back-end, middleware, and front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the invention or of what may be claimed, but rather as an exemplification of preferred embodiments of the invention. Certain features that are described in this specification in the context of separate embodiments, may also be provided in combination in a single embodiment. Conversely, various features that are described in the context of a single embodiment may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

The subject matter has been described in terms of particular variations, but other variations can be implemented and are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous. Other variations are within the scope of the following claims.

What is claimed is:

1. A system comprising:
a computer system comprising at least one hardware platform for executing computer software; and
computer software deployed on the computer system, the computer software implementing a plurality of service operations, the service operations comprising:
a create purchase order confirmation operation operable to send a notification to create a confirmation of a purchase order;
a change purchase order based on delivery values operation operable to send a notification to change the delivered quantity of a purchase order;
a request purchase order change operation operable to request a change in a purchase order;
a request purchase order cancellation operation operable to request to cancel a purchase order;
a request purchase order creation operation operable to request to create a purchase order;
a notify of purchase order operation operable to send a notification about a new purchase order to accounting;
a notify of purchase order operation operable to send a notification about a new purchase order to external procurement trigger and response and to project processing;
a maintain purchase request operation operable to send a notification to update an existing purchase order;
a confirm purchase request operation operable to send a notification to confirm a new purchase order;
a maintain purchasing contract release operation operable to send a notification to create or update purchasing contract releases;
a notify of product catalog operation operable to send a notification about a new product catalog;
a cancel goods and service acknowledgement operation operable to send a notification to cancel a goods and service acknowledgement;
a create goods and service acknowledgement operation operable to send a notification to create a goods and service acknowledgement based on service from a supplier;
a notify of invoicing due operation operable to send a notification about invoicing due based on a goods and service acknowledgement;
a notify of goods and service acknowledgement operation operable to send a notification about a goods and service acknowledgement;
a notify of invoice operation operable to send a notification to accounting about an invoice;
a notify of invoice cancellation operation operable to send a notification about the cancellation of an invoice;
a notify of invoice operation operable to send a notification to due item processing about an invoice;
a notify of invoice cancellation operation operable to request to cancel an existing invoice;
a confirm invoice operation operable to send a notification to confirm an invoice;
a request ERS invoice operation operable to request an ERS invoice;
a maintain supplier quote operation operable to send a notification to update a supplier quote;
a request quote creation operation operable to request to create a supplier quote;
a notify of request for quote cancellation operation operable to send a notification about the request to cancel a supplier quote;
a notify of request for quote change operation operable to send a notification about the request to change a supplier quote;
a request quote change operation operable to request to change a supplier quote; and
a notify of quote award operation operable to send a notification about a quote award.

2. The system of claim 1, wherein the service operations further comprise:
a create purchase order based on winning quote operation operable to send a notification to create a purchase order from an accepted supplier quote;
a change purchase order based on invoiced values operation operable to send a notification to change a purchase order based on values in an invoice;
a notify of invoicing due operation operable to send a notification about an invoice due based on a purchase order that has been created, changed or cancelled;
a change purchase request operation operable to send a notification to update an existing purchase request;
a request RFQ (request for quote) execution operation operable to request a request for a quote execution;
a maintain purchasing contract operation operable to send a notification to update a purchasing contract;
a confirm request for quote operation operable to send a notification to confirm a request for quote for updating a purchasing contract;
a request RFQ execution operation operable to request a request for a quote execution;
a request RFQ cancellation operation operable to request a request for a quote cancellation;
a notify of invoicing due operation operable to send a notification about an invoice due based on a purchasing contract that has been created, changed or cancelled;
a confirm purchasing contract operation operable to send a notification to confirm a purchasing contract;
a notify of goods and service acknowledgement cancellation operation operable to send a notification about the cancellation of a goods and service acknowledgement;
a maintain invoice request operation operable to send a notification to update an invoice request;
a create invoice operation operable to send a notification to create an invoice based on a customer request;
a create invoice operation operable to send a notification to create an invoice based on a supplier request;
a notify of contract release operation operable to send a notification about a released contract;
a notify of invoiced values operation operable to send a notification about invoiced values;
a maintain request for quote operation operable to send a notification to update a request for quote;
a cancel request for quote operation operable to send a notification to cancel a request for quote;

a maintain supplier quote relations operation operable to send a notification to update supplier quote relations;

a confirm request for quote operation operable to send a notification to confirm a request for quote for updating purchase request processing and purchasing contract processing;

a request purchase order from winning quote operation operable to request to create a purchase order based on a winning quote;

a request contract from winning quote operation operable to request to create a contract based on a winning quote;

a change internal request based on procurement progress operation operable to change an internal request based on progress in procurement;

a request purchasing operation operable to request purchasing be made based on an internal request;

a request GSA based on delivery confirmation operation operable to request a goods and service acknowledgement be created based on the confirmation of a delivery; and a request invoicing based on invoice acceptance operation operable to request an invoice be created for the complete open amount of requested goods or services.

3. The system of claim 1, wherein the service operations are grouped into service interfaces, the service interfaces comprising:

a purchasing in interface that includes the create purchase order based on winning quote and the change purchase order based on delivery values service operations;

an invoice verification in interface that includes the change purchase order based on invoiced values service operation;

an ordering in interface that includes the create purchase order confirmation service operation;

an invoice verification out interface that includes the notify of invoicing due service operation;

an ordering out interface that includes the request purchase order change, the request purchase order cancellation, and the request purchase order creation service operations;

a purchasing out interface that includes the notify of purchase order service operation;

an order accounting out interface that includes the notify of purchase order service operation;

a request for quote in interface that includes the change purchase request service operation;

a purchasing in interface that includes the maintain purchase request service operation;

a request for quote out interface that includes the request RFQ execution service operation;

a purchasing out interface that includes the confirm purchase request service operation;

a contract maintenance in interface that includes the maintain purchasing contract service operation;

a request for quote in interface that includes the confirm request for quote service operation;

a contract release in interface that includes the maintain purchasing contract release service operation;

a request for quote out interface that includes the request RFQ execution and the request RFQ cancellation service operations;

a product catalog authoring out interface that includes the notify of product catalog service operation;

an invoice verification out interface that includes the notify of invoicing due service operation;

a purchasing contract out interface that includes the confirm purchasing contract service operation;

an internal acknowledgement in interface that includes the cancel goods and service acknowledgement and the create goods and service acknowledgement service operations;

an invoice verification out interface that includes the notify of invoicing due service operation;

a goods and service accounting out interface that includes the notify of goods and service acknowledgement and the notify of goods and service acknowledgement cancellation service operations;

an invoice verification in interface that includes the maintain invoice request service operation;

an internal invoicing in interface that includes the create invoice service operation;

an invoicing in interface that includes the create invoice service operation;

a contract release out interface that includes the notify of contract release service operation;

an invoice verification out interface that includes the notify of invoiced values service operation;

an invoice accounting out interface that includes the notify of invoice and the notify of invoice cancellation service operations;

a receivables payables out interface that includes the notify of invoice and the notify of invoice cancellation service operations;

an invoicing out interface that includes the confirm invoice service operation;

an ERS invoicing out interface that includes the request ERS invoice service operation;

a request for quote in interface that includes the maintain request for quote and the cancel request for quote service operations;

a purchasing contract in interface that includes the maintain supplier quote relations service operation;

a supplier quote processing in interface that includes the maintain supplier quote service operation;

a request for quote out interface that includes the confirm request for quote service operation;

a request quote processing out interface that includes the request quote creation, the notify of request for quote cancellation, and the notify of request for quote change service operations;

a purchasing out interface that includes the request purchase order from winning quote service operation;

a purchasing contract out interface that includes the request contract from winning quote service operation;

a supplier quote processing out interface that includes the request quote change service operation;

a supplier quote processing out interface that includes the notify of quote award service operation;

a purchasing in interface that includes the change internal request based on procurement progress service operation;

a purchasing out interface that includes the request purchasing service operation;

an internal acknowledgement out interface that includes the request GSA based on delivery confirmation service operation; and an internal invoicing out interface that includes the request invoicing based on invoice acceptance service operation.

4. The system of claim 1, wherein:

the computer software implementing the create purchase order based on winning quote operation, the change purchase order based on delivery values operation, the change purchase order based on invoiced values operation, the create purchase order confirmation operation, the notify of invoicing due operation, the request purchase order change operation, the request purchase order cancellation operation, the request purchase order creation operation, the notify of purchase order operation, the change purchase request operation, the maintain purchase request operation, the request RFQ execution operation, the confirm purchase request operation, the maintain purchasing contract operation, the confirm request for quote operation, the maintain purchasing contract release operation, the request RFQ execution operation, the request RFQ cancellation operation, the notify of product catalog operation, the notify of invoicing due operation, the confirm purchasing contract operation, the cancel goods and service acknowledgement operation, the create goods and service acknowledgement operation, the notify of invoicing due operation, the notify of goods and service acknowledgement operation, and the notify of goods and service acknowledgement cancellation operation is deployed on a first hardware platform;

the computer software implementing the maintain invoice request operation, the create invoice operation, the create invoice operation, the notify of contract release operation, the notify of invoiced values operation, the notify of invoice operation, the notify of invoice cancellation operation, the notify of invoice operation, the confirm invoice operation, and the request ERS invoice operation is deployed on a second hardware platform;

the computer software implementing the maintain request for quote operation, the cancel request for quote operation, the maintain supplier quote relations operation, the maintain supplier quote operation, the confirm request for quote operation, the request quote creation operation, the notify of request for quote cancellation operation, the notify of request for quote change operation, the request purchase order from winning quote operation, the request contract from winning quote operation, the request quote change operation, and the notify of quote award operation is deployed on a third hardware platform; and the computer software implementing the change internal request based on procurement progress operation, the request purchasing operation, the request GSA based on delivery confirmation operation, and the request invoicing based on invoice acceptance operation is deployed on a fourth hardware platform.

5. The system of claim 4, wherein each of the first through the fourth hardware platforms are distinct and separate from each other.

6. The system of claim 1, wherein:

the computer software implementing the create purchase order based on winning quote operation, the change purchase order based on delivery values operation, the change purchase order based on invoiced values operation, the create purchase order confirmation operation, the notify of invoicing due operation, the request purchase order change operation, the request purchase order cancellation operation, the request purchase order creation operation, the notify of purchase order operation, the notify of purchase order operation, the change purchase request operation, the maintain purchase request operation, the request RFQ execution operation, the confirm purchase request operation, the maintain purchasing contract operation, the confirm request for quote operation, the maintain purchasing contract release operation, the request RFQ execution operation, the request RFQ cancellation operation, the notify of product catalog operation, the notify of invoicing due operation, the confirm purchasing contract operation, the cancel goods and service acknowledgement operation, the create goods and service acknowledgement operation, the notify of invoicing due operation, the notify of goods and service acknowledgement operation, and the notify of goods and service acknowledgement cancellation operation is deployable on a first hardware platform;

the computer software implementing the maintain invoice request operation, the create invoice operation, the notify of contract release operation, the notify of invoiced values operation, the notify of invoice operation, the notify of invoice cancellation operation, the confirm invoice operation, and the request ERS invoice operation is deployable on a second hardware platform;

the computer software implementing the maintain request for quote operation, the cancel request for quote operation, the maintain supplier quote relations operation, the maintain supplier quote operation, the confirm request for quote operation, the request quote creation operation, the notify of request for quote cancellation operation, the notify of request for quote change operation, the request purchase order from winning quote operation, the request contract from winning quote operation, the request quote change operation, and the notify of quote award operation is deployable on a third hardware platform; and the computer software implementing the change internal request based on procurement progress operation, the request purchasing operation, the request GSA based on delivery confirmation operation, and the request invoicing based on invoice acceptance operation is deployable on a fourth hardware platform;

and wherein:

the first through the fourth hardware platforms are distinct and separate from each other.

7. The system of claim 1, wherein the computer software deployed on the computer system comprises:

a plurality of process components, each of the process components being a package of software deployed and executing on the computer system and implementing a respective and distinct business process, the plurality of process components including:

a purchase order processing process component handling purchase orders from purchasers to external suppliers requesting to deliver a specified quantity of goods, or to perform a specified service, within a specified time;

a purchase request processing process component handling requests or instructions to the purchasing department to purchase specified goods or services in specified quantities within a specified time;

a purchasing contract processing process component handling agreements between a purchaser and a supplier that cover the supply of goods or the performance of services at agreed conditions;

a goods and service acknowledgement process component used by purchasers to report the receipt of goods and services, and by suppliers to report that they have delivered the requested goods or have rendered the requested services;

a supplier invoice processing process component handling invoice documents that state the recipients' obligation to pay the suppliers for goods received or services rendered;

a request for quote processing process component handling the description of materials and services that purchasers use to request responses from potential suppliers, and the resulting quotes from the suppliers offering to sell goods and services at a certain price; and an internal request processing process component handling requests made by employees of a company for the procurement of goods for their own use, or services for company use;

and wherein:

the purchase order processing process component implements the create purchase order based on winning quote, the change purchase order based on delivery values, the change purchase order based on invoiced values, the create purchase order confirmation, the notify of invoicing due, the request purchase order change, the request purchase order cancellation, the request purchase order creation, the notify of purchase order, and the notify of purchase order service operations;

the purchase request processing process component implements the change purchase request, the maintain purchase request, the request RFQ execution, and the confirm purchase request service operations;

the purchasing contract processing process component implements the maintain purchasing contract, the confirm request for quote, the maintain purchasing contract release, the request RFQ execution, the request RFQ cancellation, the notify of product catalog, the notify of invoicing due, and the confirm purchasing contract service operations;

the goods and service acknowledgement process component implements the cancel goods and service acknowledgement, the create goods and service acknowledgement, the notify of invoicing due, the notify of goods and service acknowledgement, and the notify of goods and service acknowledgement cancellation service operations;

the supplier invoice processing process component implements the maintain invoice request, the create invoice, the notify of contract release, the notify of invoiced values, the notify of invoice, the notify of invoice cancellation, the confirm invoice, and the request ERS invoice service operations;

the request for quote processing process component implements the maintain request for quote, the cancel request for quote, the maintain supplier quote relations, the maintain supplier quote, the confirm request for quote, the request quote creation, the notify of request for quote cancellation, the notify of request for quote change, the request purchase order from winning quote, the request contract from winning quote, the request quote change, and the notify of quote award service operations; and the internal request processing process component implements the change internal request based on procurement progress, the request purchasing, the request GSA based on delivery confirmation, and the request invoicing based on invoice acceptance service operations.

8. The system of claim 1, wherein the computer software deployed on the computer system comprises:

a plurality of deployment units, each of the deployment units being a package of software packaged together to be deployed on a single physical hardware platform, the plurality of deployment units including:

a purchasing deployment unit handling aspects of purchasing goods and services including purchase order processing, purchase request processing, purchasing contract processing, and goods and service acknowledgement;

a supplier invoicing deployment unit handling invoice documents that state the recipients' obligation to pay the suppliers for goods received or services rendered;

a request for quote processing deployment unit handling the description of materials and services that purchasers use to request responses from potential suppliers, and the resulting quotes from the suppliers offering to sell goods and services at a certain price; and a requisitioning deployment unit handling requests made by employees of a company for the procurement of goods for their own use, or services for company use;

and wherein:

the purchasing deployment unit implements the create purchase order based on winning quote, the change purchase order based on delivery values, the change purchase order based on invoiced values, the create purchase order confirmation, the notify of invoicing due, the request purchase order change, the request purchase order cancellation, the request purchase order creation, the notify of purchase order, the change purchase request, the maintain purchase request, the request RFQ execution, the confirm purchase request, the maintain purchasing contract, the confirm request for quote, the maintain purchasing contract release, the request RFQ execution, the request RFQ cancellation, the notify of product catalog, the notify of invoicing due, the confirm purchasing contract, the cancel goods and service acknowledgement, the create goods and service acknowledgement, the notify of invoicing due, the notify of goods and service acknowledgement, and the notify of goods and service acknowledgement cancellation service operations;

the supplier invoicing deployment unit implements the maintain invoice request, the create invoice, the notify of contract release, the notify of invoiced values, the notify of invoice, the notify of invoice cancellation, the confirm invoice, and the request ERS invoice service operations;

the request for quote processing deployment unit implements the maintain request for quote, the cancel request for quote, the maintain supplier quote relations, the maintain supplier quote, the confirm request for quote, the request quote creation, the notify of request for quote cancellation, the notify of request for quote change, the request purchase order from winning quote, the request contract from winning quote, the request quote change, and the notify of quote award service operations; and the requisitioning deployment unit implements the change internal request based on procurement progress, the request purchasing, the request GSA based on delivery confirmation, and the request invoicing based on invoice acceptance service operations.

9. The system of claim 1, further comprising:

a repository of service descriptions, the repository including a standards-based description of each of the plurality of service operations.

10. A computer program product encoded on a tangible machine-readable information carrier for implementing a plurality of services, the product comprising computer software operable to implement service operations on a computer system, the service operations comprising:

a create purchase order confirmation operation operable to send a notification to create a confirmation of a purchase order;

a change purchase order based on delivery values operation operable to send a notification to change the delivered quantity of a purchase order;

a request purchase order change operation operable to request a change in a purchase order;

a request purchase order cancellation operation operable to request to cancel a purchase order;

a request purchase order creation operation operable to request to create a purchase order;

a notify of purchase order operation operable to send a notification about a new purchase order to accounting;

a notify of purchase order operation operable to send a notification about a new purchase order to external procurement trigger and response and to project processing;

a maintain purchase request operation operable to send a notification to update an existing purchase order;

a confirm purchase request operation operable to send a notification to confirm a new purchase order;

a maintain purchasing contract release operation operable to send a notification to create or update purchasing contract releases;

a notify of product catalog operation operable to send a notification about a new product catalog;

a cancel goods and service acknowledgement operation operable to send a notification to cancel a goods and service acknowledgement;

a create goods and service acknowledgement operation operable to send a notification to create a goods and service acknowledgement based on service from a supplier;

a notify of invoicing due operation operable to send a notification about invoicing due based on a goods and service acknowledgement;

a notify of goods and service acknowledgement operation operable to send a notification about a goods and service acknowledgement;

a notify of invoice operation operable to send a notification to accounting about an invoice;

a notify of invoice cancellation operation operable to send a notification about the cancellation of an invoice;

a notify of invoice operation operable to send a notification to due item processing about an invoice;

a notify of invoice cancellation operation operable to request to cancel an existing invoice;

a confirm invoice operation operable to send a notification to confirm an invoice;

a request ERS invoice operation operable to request an ERS invoice;

a maintain supplier quote operation operable to send a notification to update a supplier quote;

a request quote creation operation operable to request to create a supplier quote;

a notify of request for quote cancellation operation operable to send a notification about the request to cancel a supplier quote;

a notify of request for quote change operation operable to send a notification about the request to change a supplier quote;

a request quote change operation operable to request to change a supplier quote; and a notify of quote award operation operable to send a notification about a quote award.

11. The product of claim 10, wherein the service operations further comprise:

a create purchase order based on winning quote operation operable to send a notification to create a purchase order from an accepted supplier quote;

a change purchase order based on invoiced values operation operable to send a notification to change a purchase order based on values in an invoice;

a notify of invoicing due operation operable to send a notification about an invoice due based on a purchase order that has been created, changed or cancelled;

a change purchase request operation operable to send a notification to update an existing purchase request;

a request RFQ (request for quote) execution operation operable to request a request for a quote execution;

a maintain purchasing contract operation operable to send a notification to update a purchasing contract;

a confirm request for quote operation operable to send a notification to confirm a request for quote for updating a purchasing contract;

a request RFQ execution operation operable to request a request for a quote execution;

a request RFQ cancellation operation operable to request a request for a quote cancellation;

a notify of invoicing due operation operable to send a notification about an invoice due based on a purchasing contract that has been created, changed or cancelled;

a confirm purchasing contract operation operable to send a notification to confirm a purchasing contract;

a notify of goods and service acknowledgement cancellation operation operable to send a notification about the cancellation of a goods and service acknowledgement;

a maintain invoice request operation operable to send a notification to update an invoice request;

a create invoice operation operable to send a notification to create an invoice based on a customer request;

a create invoice operation operable to send a notification to create an invoice based on a supplier request;

a notify of contract release operation operable to send a notification about a released contract;

a notify of invoiced values operation operable to send a notification about invoiced values;

a maintain request for quote operation operable to send a notification to update a request for quote;

a cancel request for quote operation operable to send a notification to cancel a request for quote;

a maintain supplier quote relations operation operable to send a notification to update supplier quote relations;

a confirm request for quote operation operable to send a notification to confirm a request for quote for updating purchase request processing and purchasing contract processing;

a request purchase order from winning quote operation operable to request to create a purchase order based on a winning quote;

a request contract from winning quote operation operable to request to create a contract based on a winning quote;

a change internal request based on procurement progress operation operable to change an internal request based on progress in procurement;

a request purchasing operation operable to request purchasing be made based on an internal request;

a request GSA based on delivery confirmation operation operable to request a goods and service acknowledgement be created based on the confirmation of a delivery; and a request invoicing based on invoice acceptance operation operable to request an invoice be created for the complete open amount of requested goods or services.

12. The product of claim 10, wherein the computer software comprises:

a plurality of process components, each of the process components being a package of software deployed and executing on the computer system and implementing a respective and distinct business process, the plurality of process components including:

a purchase order processing process component handling purchase orders from purchasers to external suppliers requesting to deliver a specified quantity of goods, or to perform a specified service, within a specified time;

a purchase request processing process component handling requests or instructions to the purchasing department to purchase specified goods or services in specified quantities within a specified time;

a purchasing contract processing process component handling agreements between a purchaser and a supplier that cover the supply of goods or the performance of services at agreed conditions;

a goods and service acknowledgement process component used by purchasers to report the receipt of goods and services, and by suppliers to report that they have delivered the requested goods or have rendered the requested services;

a supplier invoice processing process component handling invoice documents that state the recipients' obligation to pay the suppliers for goods received or services rendered;

a request for quote processing process component handling the description of materials and services that purchasers use to request responses from potential suppliers, and the resulting quotes from the suppliers offering to sell goods and services at a certain price; and an internal request processing process component handling requests made by employees of a company for the procurement of goods for their own use, or services for company use;

and wherein:

the purchase order processing process component implements the create purchase order based on winning quote, the change purchase order based on delivery values, the change purchase order based on invoiced values, the create purchase order confirmation, the notify of invoicing due, the request purchase order change, the request purchase order cancellation, the request purchase order creation, the notify of purchase order, and the notify of purchase order service operations;

the purchase request processing process component implements the change purchase request, the maintain purchase request, the request RFQ execution, and the confirm purchase request service operations;

the purchasing contract processing process component implements the maintain purchasing contract, the confirm request for quote, the maintain purchasing contract release, the request RFQ execution, the request RFQ cancellation, the notify of product catalog, the notify of invoicing due, and the confirm purchasing contract service operations;

the goods and service acknowledgement process component implements the cancel goods and service acknowledgement, the create goods and service acknowledgement, the notify of invoicing due, the notify of goods and service acknowledgement, and the notify of goods and service acknowledgement cancellation service operations;

the supplier invoice processing process component implements the maintain invoice request, the create invoice, the notify of contract release, the notify of invoiced values, the notify of invoice, the notify of invoice cancellation, the confirm invoice, and the request ERS invoice service operations;

the request for quote processing process component implements the maintain request for quote, the cancel request for quote, the maintain supplier quote relations, the maintain supplier quote, the confirm request for quote, the request quote creation, the notify of request for quote cancellation, the notify of request for quote change, the request purchase order from winning quote, the request contract from winning quote, the request quote change, and the notify of quote award service operations; and the internal request processing process component implements the change internal request based on procurement progress, the request purchasing, the request GSA based on delivery confirmation, and the request invoicing based on invoice acceptance service operations.

13. The product of claim 12, wherein:

each of the plurality of process components is assigned to no more than one deployment unit among multiple deployment units, and each deployment unit is deployable on a separate computer hardware platform independent of every other deployment unit; and all interaction between a process component in one deployment unit and any other process component in any other deployment unit takes place through the respective service operations of the two process components.

14. The product of claim 13, wherein the deployment units comprise:

a purchasing deployment unit that includes the purchase order processing, the purchase request processing, the purchasing contract processing, and the goods and service acknowledgement process components;

wherein:

a supplier invoicing deployment unit includes the supplier invoice processing process component;

a request for quote processing deployment unit includes the request for quote processing process component; and a requisitioning deployment unit includes the internal request processing process component.

15. The product of claim 12, wherein:

the purchase order processing process component includes a purchase order business object and a purchase order confirmation business object, wherein the purchase order business object is responsible for the request from a purchaser to an external supplier to deliver a specified quantity of goods (or perform a specified service) within a specified time, and the purchase order confirmation business object is responsible for the confirmation from an external supplier to the request of a purchaser to deliver a specified quantity of material (or perform a specified service) at a specified price within a specified time;

the purchase request processing process component includes a purchase request business object, wherein the purchase request business object is responsible for the request or instruction to the purchasing department to purchase specified goods or services in specified quantities within a specified time;

the purchasing contract processing process component includes a purchasing contract business object, wherein the purchasing contract business object is responsible for the agreement between a purchaser and a supplier that covers the supply of goods or the performance of services at agreed conditions;

the goods and service acknowledgement process component includes a goods and service acknowledgement business object, wherein the goods and service acknowledgement business object is responsible for the document reporting the receipt of goods and services;

the supplier invoice processing process component includes a supplier invoice request business object, an evaluated receipt settlement run business object, a supplier invoice business object, and a supplier invoice verification exception business object, wherein the supplier invoice request business object is responsible for the document that is sent to invoice verification advising that an invoice for specified quantities and prices is expected, the evaluated receipt settlement run business object is responsible for supplier invoices of type credit memo, the supplier invoice business object is responsible for the document that states the recipient's (usually the purchaser's) obligation to pay the supplier for goods received or services rendered, and the supplier invoice verification exception business object is responsible for a group of related issues arising during a supplier invoice verification process;

the request for quote processing process component includes a request for quote business object and a supplier quote business object, wherein the business object is responsible for the request from a buyer to a bidder to submit a quote for a material or a service according to specified criteria, and the business object is responsible for the response to a request for quote, in which a supplier offers to sell materials and services according to the requested criteria; and the internal request processing process component includes an internal request business object, wherein the business object is responsible for the request for the procurement of goods or services.

16. The product of claim 12, wherein:

each of the process components includes at least one business object; and none of the business objects of any one of the process components interacts directly with any of the business objects included in any of the other process components.

17. The product of claim 16, wherein the business objects comprise a business process object.

18. The product of claim 16, wherein:

none of the business objects included in any one of the process components is included in any of the other process components.

19. The product of claim 10, wherein the computer software comprises:

a plurality of deployment units, each of the deployment units being a package of software packaged together to be deployed on a single physical hardware platform, the plurality of deployment units including:

a purchasing deployment unit that includes a purchase order, a purchase order confirmation, a purchase request, a purchasing contract and a goods and service acknowledgement business object, wherein the purchase order business object represents a request from a purchaser to an external supplier to deliver a specified quantity of goods (or perform a specified service) within a specified time, the purchase order confirmation business object represents a confirmation from an external supplier to the request of a purchaser to deliver a specified quantity of material (or perform a specified service) at a specified price within a specified time, the purchase request business object represents a request or instruction to the purchasing department to purchase specified goods or services in specified quantities within a specified time, the purchasing contract business object represents an agreement between a purchaser and a supplier that covers the supply of goods or the performance of services at agreed conditions, and the goods and service acknowledgement business object represents a document reporting the receipt of goods and services;

a supplier invoicing deployment unit that includes a supplier invoice request, an evaluated receipt settlement run, a supplier invoice and a supplier invoice verification exception business object, wherein the supplier invoice request business object represents a document that is sent to invoice verification advising that an invoice for specified quantities and prices is expected, the evaluated receipt settlement run business object represents supplier invoices of type credit memo, the supplier invoice business object represents a document that states the recipient's (usually the purchaser's) obligation to pay the supplier for goods received or services rendered, and the supplier invoice verification exception business object represents a group of related issues arising during a supplier invoice verification process;

a request for quote processing deployment unit that includes a request for quote and a supplier quote business object, wherein the request for quote business object represents a request from a buyer to a bidder to submit a quote for a material or a service according to specified criteria, and the supplier quote business object represents a response to a request for quote, in which a supplier offers to sell materials and services according to the requested criteria; and a requisitioning deployment unit that includes an internal request business object, wherein the internal request business object represents a request for the procurement of goods or services.

20. The product of claim 10, further comprising:

a purchasing deployment unit that implements the create purchase order based on winning quote, the change purchase order based on delivery values, the change purchase order based on invoiced values, the create purchase order confirmation, the notify of invoicing due, the request purchase order change, the request purchase order cancellation, the request purchase order creation, the notify of purchase order, the change purchase request, the maintain purchase request, the request RFQ execution, the confirm purchase request, the maintain purchasing contract, the confirm request for quote, the maintain purchasing contract release, the request RFQ execution, the request RFQ cancellation, the notify of product catalog, the notify of invoicing due, the confirm purchasing contract, the cancel goods and service acknowledgement, the create goods and service acknowledgement, the notify of invoicing due, the notify of goods and service acknowledgement, and the notify of goods and service acknowledgement cancellation service operations;
a supplier invoicing deployment unit that implements the maintain invoice request, the create invoice, the notify of contract release, the notify of invoiced values, the notify of invoice, the notify of invoice cancellation, the confirm invoice, and the request ERS invoice service operations;
a request for quote processing deployment unit that implements the maintain request for quote, the cancel request for quote, the maintain supplier quote relations, the maintain supplier quote, the confirm request for quote, the request quote creation, the notify of request for quote cancellation, the notify of request for quote change, the request purchase order from winning quote, the request contract from winning quote, the request quote change, and the notify of quote award service operations; and
a requisitioning deployment unit that implements the change internal request based on procurement progress, the request purchasing, the request GSA based on delivery confirmation, and the request invoicing based on invoice acceptance service operations.

21. The product of claim 10, further comprising:
a plurality of process agents, each process agent being either an inbound process agent or an outbound process agent, an inbound process agent being operable to receive a message from an inbound operation, an outbound process agent being operable to cause an outbound operation to send a message, each process agent being associated with exactly one process component;
wherein:
the inbound process agents comprise a first inbound process agent operable to start the execution of the step requested in a first inbound message by creating or updating at least one business object instance; and
the outbound process agents comprise a first asynchronous outbound process agent that is called after a business object that is associated with the first outbound process agent changes.

22. A computer-implemented method for causing at least one processor to provide services from a computer system having supplier relationship management functionality, the method comprising the following steps performed by the at least one processor:
providing services through the sending of electronic messages associated with at least one operation from a first process component to at least one other process component, the electronic messages including:
a notification to create a purchase order from an accepted supplier quote;
a notification to change the delivered quantity of a purchase order;
a notification to change a purchase order based on values in an invoice;
a notification to create a confirmation of a purchase order;
a notification about an invoice due based on a purchase order that has been created, changed or cancelled;
a notification requesting a change in a purchase order;
a notification requesting to cancel a purchase order;
a notification requesting to create a purchase order;
a notification about a new purchase order to external procurement trigger and response and to project processing;
a notification about a new purchase order to accounting;
a notification to update an existing purchase request;
a notification to update an existing purchase order;
a notification requesting a request for a quote execution;
a notification to confirm a new purchase order;
a notification to update a purchasing contract;
a notification to confirm a request for quote for updating a purchasing contract;
a notification to create or update purchasing contract releases;
a notification requesting a request for a quote execution;
a notification requesting a request for a quote cancellation;
a notification about a new product catalog;
a notification about an invoice due based on a purchasing contract that has been created, changed or cancelled;
a notification to confirm a purchasing contract;
a notification to cancel a goods and service acknowledgement;
a notification to create a goods and service acknowledgement based on an internal request;
a notification about an invoicing due based on a goods and service acknowledgement;
a notification about a goods and service acknowledgement;
a notification about the cancellation of a goods and service acknowledgement;
a notification to update an invoice request;
a notification to create an invoice based on a customer request;
a notification to create an invoice based on a supplier request;
a notification about a released contract;
a notification about invoiced values;
a notification to accounting about an invoice;
a notification about the cancellation of an invoice;
a notification to due item processing about an invoice;
a notification requesting to cancel an existing invoice;
a notification to confirm an invoice;
a notification requesting an ERS invoice;
a notification to update a request for quote;
a notification to cancel a request for quote;
a notification to update supplier quote relations;
a notification to update a supplier quote;
a notification to confirm a request for quote for updating purchase request processing and purchasing contract processing;
a notification requesting to create a supplier quote;
a notification about the request to cancel a supplier quote;
a notification about the request to change a supplier quote;
a notification requesting to create a purchase order based on a winning quote;
a notification requesting to create a contract based on a winning quote;
a notification requesting to change a supplier quote;
a notification about a quote award;
a notification to change an internal request based on progress in procurement;
a notification requesting purchasing be made based on an internal request;

a notification requesting a goods and service acknowledgement be created based on the confirmation of a delivery; and a notification requesting an invoice be created for the complete open amount of requested goods or services; and receiving at least one electronic message at the first process component responsive to at least one of the sent electronic messages.

* * * * *